(12) United States Patent
White et al.

(10) Patent No.: US 8,630,886 B2
(45) Date of Patent: *Jan. 14, 2014

(54) METHOD AND SYSTEM FOR PROVIDING ENHANCED TROUBLE TICKET STATUS CONTENT

(75) Inventors: Chris L. White, Plano, TX (US); Evan Pedersen, Colorado Springs, CO (US); Karen Monk, Larkspur, CO (US); Mark Weissler, Colorado Springs, CO (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 49 days.

This patent is subject to a terminal disclaimer.

(21) Appl. No.: 13/253,141

(22) Filed: Oct. 5, 2011

(65) Prior Publication Data

US 2013/0090976 A1  Apr. 11, 2013

(51) Int. Cl.
 *G06Q 10/00* (2012.01)
(52) U.S. Cl.
 USPC .......................................................... 705/7.27

(58) Field of Classification Search
 USPC ......................................................... 705/7.27
 See application file for complete search history.

(56) References Cited

U.S. PATENT DOCUMENTS

| | | | |
|---|---|---|---|
| 6,865,268 B1 * | 3/2005 | Matthews et al. | 379/265.09 |
| 7,426,654 B2 | 9/2008 | Adams et al. | |
| 7,716,077 B1 * | 5/2010 | Mikurak | 705/7.12 |
| 2003/0200299 A1 * | 10/2003 | Jamison, III | 709/223 |
| 2004/0179654 A1 | 9/2004 | Boetje et al. | |
| 2004/0208296 A1 * | 10/2004 | Aboujaoude et al. | 379/88.12 |
| 2005/0060217 A1 | 3/2005 | Douglas et al. | |
| 2008/0097780 A1 * | 4/2008 | Boetje et al. | 705/1 |
| 2011/0066559 A1 * | 3/2011 | White et al. | 705/304 |

* cited by examiner

*Primary Examiner* — Mark A Fleischer

(57) ABSTRACT

An approach is provided for online trouble ticket servicing. As part of a workflow, one or more activities, which are associated with a trouble ticket corresponding to a service, are monitored, wherein the one or more activities are tracked by a workflow engine. Status information is repeatedly acquired for the one or more activities until a predetermined milestone is reached according to the workflow. The status information is stored for presentation to a subscriber of the service.

12 Claims, 21 Drawing Sheets

METHOD AND SYSTEM FOR PROVIDING ENHANCED TROUBLE TICKET STATUS CONTENT

BACKGROUND INFORMATION

Modern communication systems involve a delicate interplay of network components and associated facilities to reliably provide a host of services (e.g., voice and data services, content delivery, etc.) for a service provider. These systems are vital to business operations, whereby any downtime can impose a significant cost to the service provider. The impact of network failures (even very minor ones lasting only minutes) can be measured in thousands or even millions of dollars. Therefore, customers are acutely aware of problems that arise with such systems and have a vested interest in ensuring that these problems are resolved in a timely manner. Consequently, "trouble ticket" systems have been developed to track problem events that arise in the system, along with the activities being taken to resolve such problems. For example, to obtain the current status of a trouble ticket, a customer may contact a customer service representative or agent of the service provider, as to have the representative access and relay the status of the trouble ticket. Unfortunately, even if status information can be obtained, little meaningful information is provided, as technicians, who are dispatched to address the trouble, do not typically supply sufficient status information.

Further, this situation can be frustrating to customers that do not have any other means of determining whether the problem is in the process of being resolved, and may feel as though the problem is being overlooked by the service provider. However, because a trouble ticketing system is traditionally an internal operations system, access to this such system by the end user or customer is gravely limited to protect against security compromises and/or unnecessarily exposing the internal workings of or information about the service provider. Hence, traditional trouble ticketing systems support little to no interaction directly with the customer.

Based on the foregoing, there is a need for a trouble ticket system that can provide customers some interaction with the system.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 8A-8F are diagrams illustrating exemplary elements of a graphical user interface for selection of status updates, according to various embodiments;

FIGS. 9A-9E are diagrams illustrating exemplary elements of a graphical user interface for selection of status update activity, according to various embodiments;

DESCRIPTION OF THE PREFERRED EMBODIMENT

A preferred apparatus, method, and software for providing enhanced trouble ticket status content are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a trouble ticketing service, it is contemplated that various exemplary embodiments are also applicable to other services, particularly online transactional services.

Figure 1:
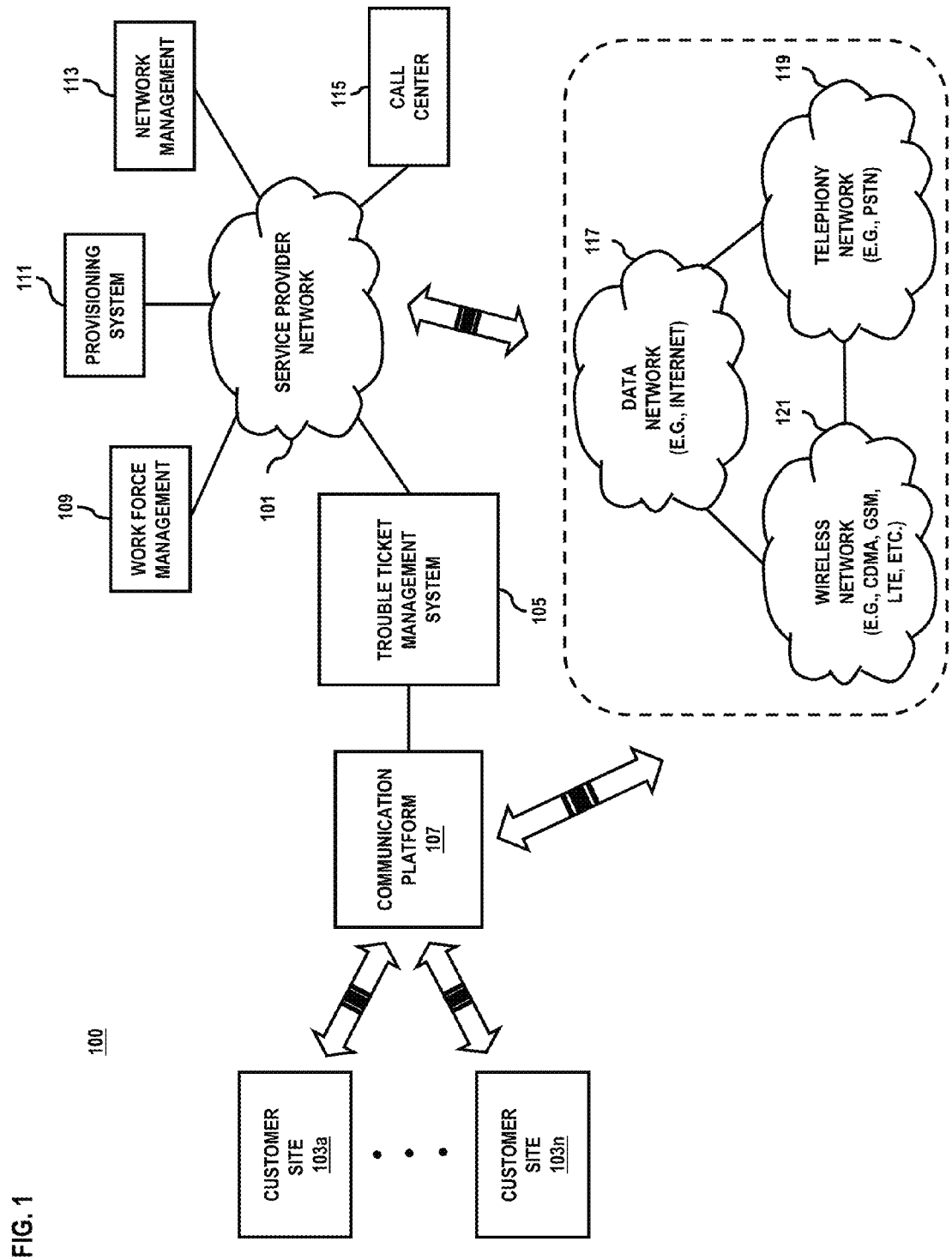
FIG. 1 is a diagram of a system configured to provide online trouble ticket management, according to one embodiment.

FIG. 1 is a diagram of a system configured to provide online trouble ticket management, according to one embodiment. For purpose of illustration, a system 100 includes a service provider network 101, which is configured to provide communication services (e.g., voice, data, video, etc.) to various end users (e.g., customers or subscribers) at customer sites 103a-103n. Although not shown, each of the customer sites 103a-103n can include various equipment and/or communication infrastructure to receive the communication services. That is, the various communication conduits or facilities used to provide the services to the customers can include the use of any form of wired or wireless communication architecture (e.g., land-line, cable, fiber optic, satellite-based, cellular, or other communication architecture). Moreover, the customer can be an individual, or any an entity, such as a corporation, enterprise, or organization, that receives services from the service provider network 101. As part of its operations, the service provider can deploy a trouble ticket management system 105 to address problems associated with the services. Among other functions, trouble ticket management system 105 provides creation of an order or "trouble ticket" to resolve a particular service issue. In certain embodiments, activities associated with the trouble ticket can be monitored, as part of a workflow, to ensure the routine and efficient extraction of information (e.g., status information) can be performed and such information is timely conveyed to the subscriber or consumer of the service. For instance, status information can be repeatedly provided for the one or more activities until a predetermined milestone is reached according to the workflow.

As mentioned, traditionally, trouble ticket systems are support subsystems that are not accessible by the end users or customers, but are internally utilized and managed by the service provider. Even though users have become acclimated to conducting online transactions, ranging from purchases of goods and services to self-management of these services, users can be easily deterred if the process is complex or cumbersome.

As shown, a communication platform 107 permits trouble ticket management system 105 to be accessed by customer sites 103a-103n using various technologies. For example, a customer may communicate a problem or issue using a web portal, email, a messaging service (e.g., Short Messaging Service (SMS), Multimedia Messaging Service (MMS), instant messaging (IM), etc.), voice communication, pager, etc. The communication platform 107 is further detailed in FIG. 5.

According to certain embodiments, the service provider network 101 includes a workforce management system 109, a provisioning system 111, and a network management system 113. The workforce management 109 monitors and controls allocation of human resources (e.g., technicians) to perform various tasks needed to provide customers with the services, such as set-up and maintenance of customer's services. The provisioning system 111 provides acquisition of resources to implement the particular services to the customers. The network management system 113 ensures high network availability and performance by monitoring equipment and facilities of service provider network 101 and initiating network restoration procedures, for example.

To process customer problems and concerns that arise with the customer's services, the service provider network 101 can utilize a call center 115 to handle customer requests received via communication platform 107. As noted, the trouble ticket management system 105 allows for the creation of a trouble ticket for a customer problem, which can be used to track the activities or steps being taken to resolve the problem. In order to determine the status of the actions being taken with regard to a problem, the customer can contact a customer service representative at the call center 115, and the customer service representative can access the trouble ticket management system to determine the status of the trouble ticket. System 105 can also provide automated updating and reporting of trouble ticket status to customers via a communication platform 107.

Under the example of FIG. 1, service provider network 101 may interface with one or more communication networks: data network 117, telephony network 119, and wireless network 121. Networks 117-121 may be any suitable wireline and/or wireless network. For example, telephony network 119 may include a circuit-switched network, such as the public switched telephone network (PSTN), an integrated services digital network (ISDN), a private branch exchange (PBX), or other like network. Also, wireless network 121 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), long term evolution (LTE), satellite, and the like. Moreover, data network 117 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

In terms of customer satisfaction, it is beneficial for the service provider network 101 to provide customers with the most up-to-date status of the trouble ticket as possible. Additionally, in terms of efficient utilization of resources, it is also beneficial for the service provider network 101 to provide customers with automated access to the status of the trouble ticket. For example, due to the fact that service-downtime can have dramatic effects on a customer entity's ability to conduct business, a corporate customer may repeatedly contact a call center 115 to determine the status of the trouble ticket, in a system that does not include an automated trouble ticket status update system. Such a situation can result in an extremely heavy volume of calls to a call center, which requires that the service provider network employ and provide the needed resources to a large number of call center employees in order to process such calls.

The trouble ticket management system 105 and communication platform 107 allow a customer to obtain the status on a trouble ticket without the need to contact an agent in an inbound call center. The trouble ticket management system 105 can automatically monitor the repair progress of trouble tickets and determine the current status summary by noting, e.g., date and time the ticket is created, analysis of test results, reason why a ticket is on hold and pending dispatch, overall time to repair, when the last update was made to the ticket, etc. The customer can access such status summary information whenever desired, and/or can be automatically apprised (i.e., without a request by the customer) of such status summary either on a periodic basis or on an event-triggered basis, as desired by the customer.

However, customers may, for one reason or another, not take advantage of online capabilities of trouble ticket management system 105. Moreover, even if online access is achieved, the experience by the customer needs to be meaningful with respect to the information provided by such online system.

Figure 2:
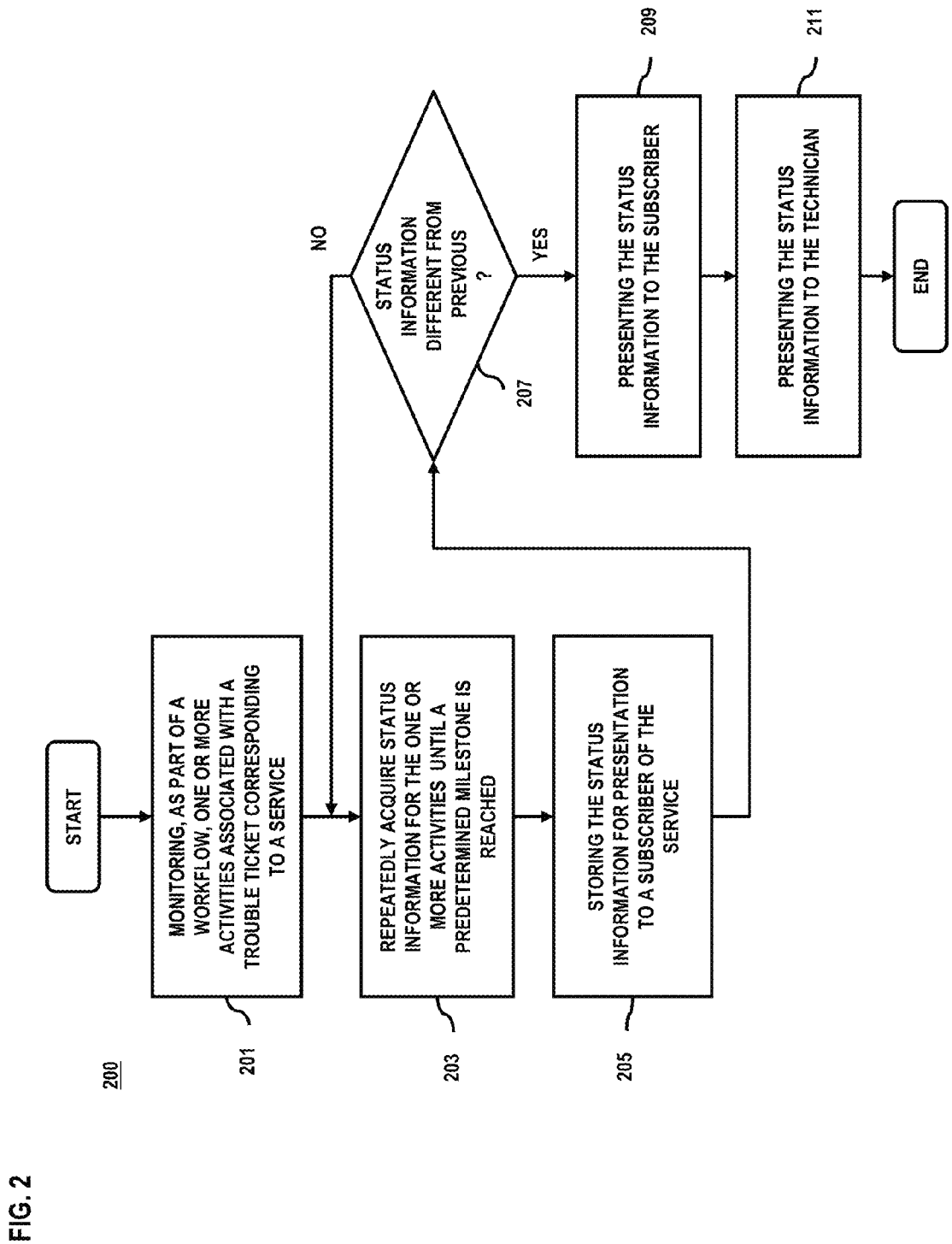
FIG. 2 is a flowchart of a process for providing enhanced trouble ticket status content, according to one embodiment.

FIG. 2 is a flowchart of a process for providing enhanced trouble ticket status content, according to one embodiment. In step 201, process 200 monitors, as part of a workflow, one or more activities associated with a trouble ticket corresponding to a service. The one or more activities are tracked by a workflow engine (shown with respect to FIG. 5) associated with system 105. Next, per step 203, process 200 repeatedly acquires status information for the one or more activities until a predetermined milestone is reached according to the workflow. In one embodiment, process 200 presents a prompt, via a graphical user interface (GUI), to a user designated to execute the one or more activities; the prompt is presented to acquire the status information. In one embodiment, the repetition can be time-based (e.g., periodic, predetermined schedules, etc.) or event-based. The status information is then stored (per step 205) for presentation to a subscriber of the service.

In step 207, process 200 determines whether the status information to be presented to the subscriber is different from a previously presented status information. The status information is presented to the subscriber if the status information is determined to be different, as in step 209. Further, it is contemplated that the status information is presented to the subscriber as part of the workflow prior to a request by subscriber for the status information. Alternatively or additionally, the status information is also provided to the field technician, as in step 211.

Figure 3:
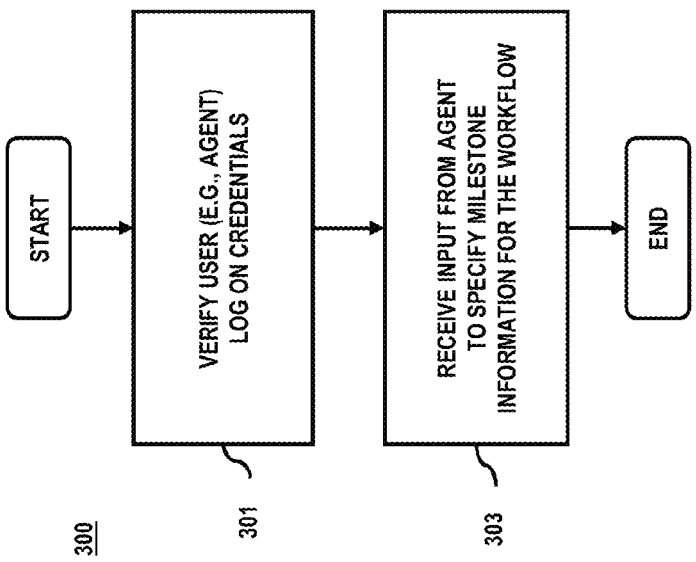
FIG. 3 is a flowchart of a process for inputting milestones into a workflow to proactively provide status information, according to one embodiment.

FIG. 3 is a flowchart of a process for inputting milestones into a workflow to proactively provide status information, according to one embodiment. Under this scenario, process 300 involves an agent of the call center 115 logging on the ticket management system 105 using predetermined log on credentials (e.g., user ID and passcode). The agent is associated with a service provider of the service. Next, system 105 verifies the log on credentials to ensure the agent is an authorized user (step 301). In step 303, input is received from the agent to specify milestone information for the workflow.

Figure 4:
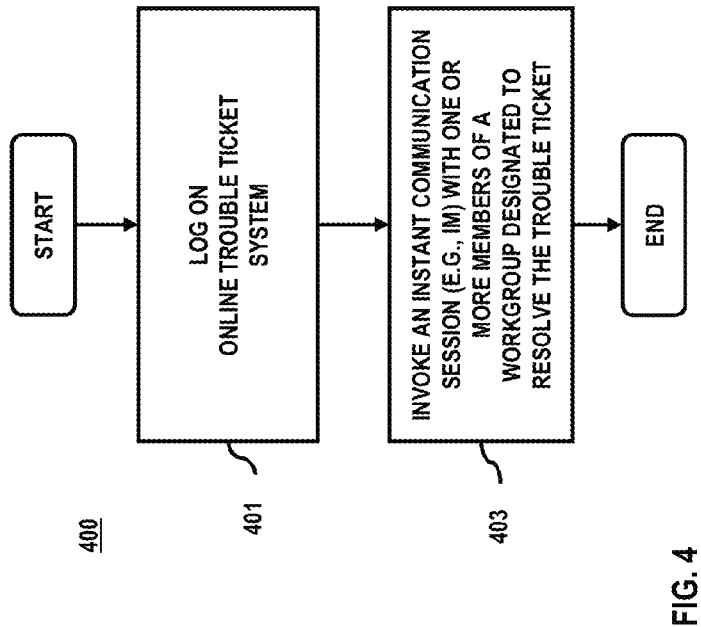
FIG. 4 is a flowchart of a process for establishing instant communication sessions to support trouble ticket handling, according to one embodiment.

FIG. 4 is a flowchart of a process for establishing instant communication sessions to support trouble ticket handling, according to one embodiment. With process 400, the agent can readily communicate with other agents to confer on a trouble ticket. The agent first logs in the trouble ticket management system 105, per step 101. In step 403, process 400 can invoke an instant communication session with one or more members of a workgroup designated to resolve the trouble ticket. In this example, the communication session can be established using instant messaging (IM) application within this community or workgroup of agents.

Figure 14:
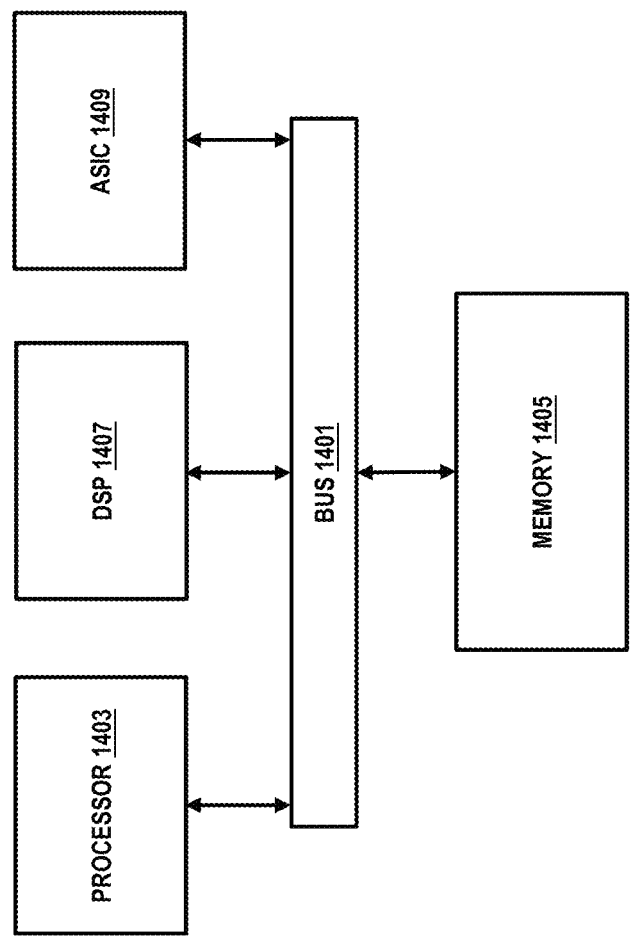
FIG. 14 is a diagram of a chip set that can be used to implement various exemplary embodiments.

Processes 200, 300, and 400 can be implemented in, for instance, a chip set including a processor and a memory as shown in FIG. 14. It is contemplated that these processes 200, 300, and 400 may be executed by the trouble ticket management system 105. Further, it is noted that the steps of each of the respective processes 200, 300, and 400 may be performed in any suitable order, as well as combined or separated in any suitable manner.

Figure 5:
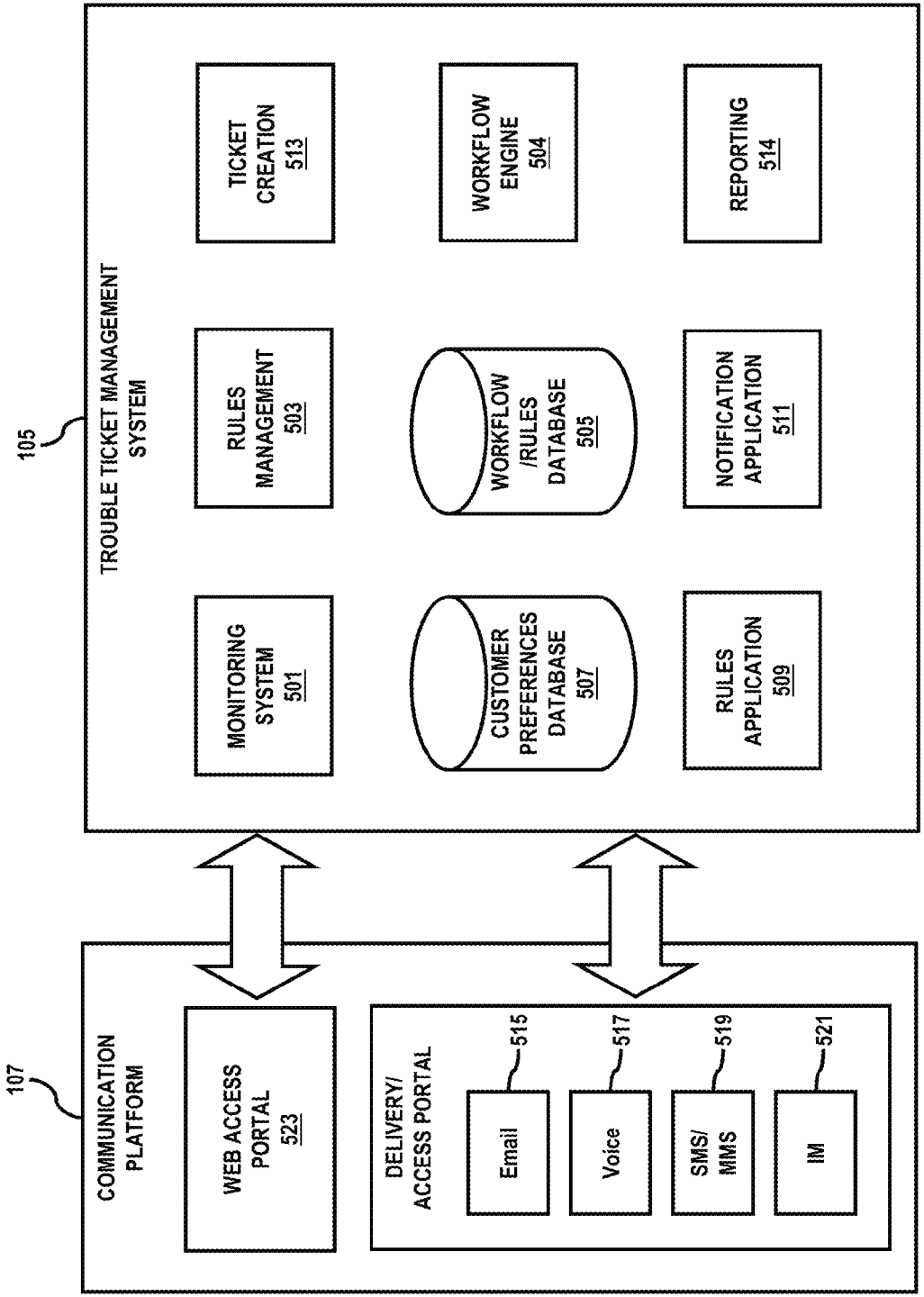
FIG. 5 is a diagram of the trouble ticket management system and the communication platform utilized in the system of FIG. 1, according to various embodiments.

FIG. 5 is a diagram of the trouble ticket management system and the communication platform utilized in the system of FIG. 1, according to various embodiments. By way of example, the trouble ticket management system 105 includes a monitoring system 501, a rules management module 503, a workflow engine 504, a workflow/rules database 505, a customer preferences database 507, a rules application module 509, a notification application module 511, a ticket creation module 513, and a reporting module 514. The monitoring system 501 is used to monitor events that occur in the trouble ticket management system 105 for analysis. The rules management module 503 allows a manager to create, define, modify, and delete rules and workflows that determine when an event in the trouble ticket management system 105 triggers a status summary update and/or communication with the customer.

The workflow engine 504 provides creation of tasks and milestones forming a workflow. In some embodiments, the workflow includes a sequence of operations relating to trouble ticket creation and resolution. The progression or completion of this sequence can be governed by rules and policies specified by the service provider.

The workflow/rules database 505 stores the various workflows and rules. Engineers, for example, can identify exactly what has to happen to trigger the new event (e.g., events can only be triggered by certain workgroups, types of users, or a person), and/or there can be exceptions built into the system, for example, conditional logic can bet applied to the new trigger.

The customer preferences database 507 stores the customer's preference regarding the manner in which they receive or access status summary updates, for example, the portal via which the prefer to receive or access such updates (e.g., via email, voice, short message service (SMS), multimedia message service (MMS), instant messaging (IM), web, etc.), their contact information, the frequency of updates (e.g., on a periodic basis at a certain interval, on an event basis, etc.).

The rules application module 509 receives the event updates detected by the monitoring system 501 and applies the triggering criteria from the workflow/rules database 505 to determine if a status summary update has been triggered. The notification application module 511 receives the triggered status summary updates determined by the rules application module 509 and applies the customer preferences from the customer preferences database 507 to determine if and in what manner a status summary update should be communicated to or made available to the customer via the communication platform 107.

Ticket creation module 513 enables a user to establish a trouble ticket for the services offered by the service provider. By way of example, the service provider is a provider of telecommunication services, whereby customers can provision, e.g., circuits for their networks. The ticket creation process can be assisted by the graphical user interface, according to one embodiment. The user can be a customer or an agent (associated with call center 115). However, as mentioned, trouble ticket management system 105 can encourage the customers to create the trouble tickets themselves, rather than require resources of the service provider to be expended. The resulting cost savings (stemming from the more efficient use of resources) can be returned to the customers in form of reduce circuit costs, etc. Further, the customers can more timely learn of the measures taken to resolve their service problems. After creation of the trouble ticket by module 513, the ticket can be supplied to the workforce management system 109 for dispatch of a technician, for instance.

In one embodiment, the ticket creation module 513 has the capability to acquire feedback information from one or more customers regarding why they are not utilizing the online service provided by system 105 to create trouble tickets on their own. The feedback information can be used to generate various reports via reporting module 514 to assist with developing a method to encourage usage of the online service.

As seen, the communication platform 107, in one embodiment, includes a communication (or delivery/access) portal having an email portal 515, a voice portal 517, an SMS/MMS portal 519, and an instant messaging (IM) portal 521. The communication platform 107 also includes a web access portal 523. The communication portal 523 allows trouble ticket management system 105 to automatically send status summary updates to the customer, and/or allows the customer to proactively access and retrieve such status summary updates via the various portals 515-421 as, e.g., specified by the customer. For example, upon updating of the status summary, the notification application 511 could direct a telephone communication to the customer contact number that provides an automated voice message indicating the updated status summary, and could provide the customer with a series of interactive menus that allow the customer to take further actions with regard to the trouble ticket or to obtain further information about the status summary, etc. Similarly, such updates could be available to the customer via email, SMS/MMS text, instant messaging, or web access portal, based on the customer's preferences.

The communication platform 107 can provide automated status summary messages to be sent to the customer upon initiation of the trouble ticket management system 105, or for the customer to contact the trouble ticket management system 105 to retrieve messages. Such messages can be presented to the customer as either a one way communication, or can provide the customer with the ability to communicate further information to the system 105 and/or request and retrieve additional information (e.g., using web links, or telephone menus, contact email addresses, etc.).

Figure 6:
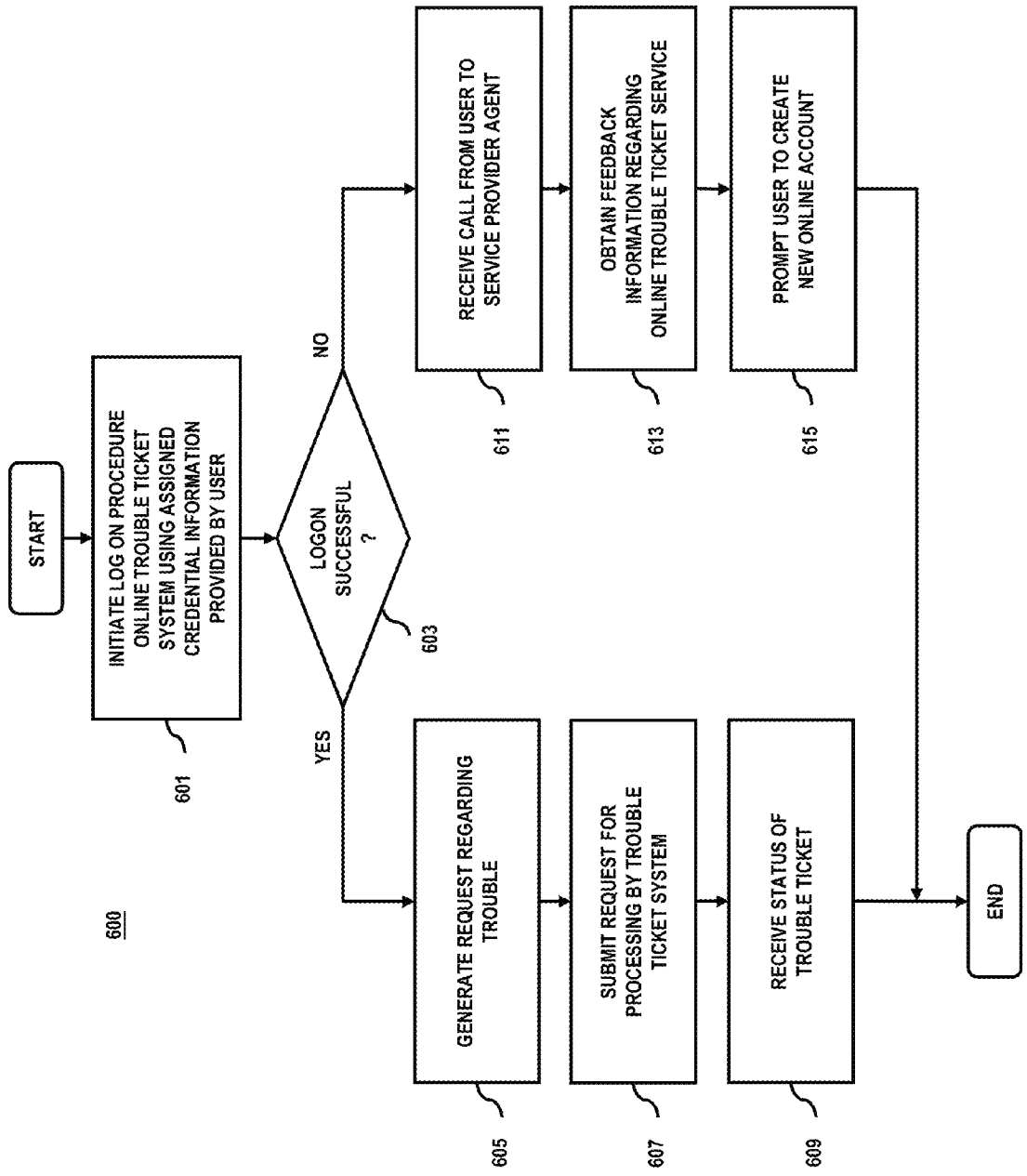
FIG. 6 is a flowchart of a process for utilizing an online trouble ticket management system, according to one embodiment.

FIG. 6 is a flowchart of a process for utilizing an online trouble ticket management system, according to one embodiment. Process 600 provides, per step 601, the initiation of a logon procedure to trouble ticket management system 105. Such communication session can, for example, be established using a browser application by a customer with the communication platform 107, which then interfaces trouble ticket management system 105. Process 600 then determines whether the logon procedure is successful, as in step 603. In one embodiment, any known logon procedure involving the authentication of the user can be utilized. For example, the user can be prompted to supply various credential information, such as, a user identifier (ID) and a passcode. If the logon procedure is successful, the user (e.g., customer) can access trouble ticket management system 105 to generate a request regarding a particular trouble or problem with a service, as is step 605. In step 607, the request is submitted for processing by the trouble ticket management system 105. Subsequently, the trouble ticket management system 105 can supply status information about the particular trouble to the customer (step 609).

However, if the logon procedure is unsuccessful for any reason, e.g., the customer has forgotten the necessary credential information, the customer generally would resort to "offline" means. For instance, the customer may place a call into call center 115 to speak with a service provider agent (step 611), who can assist with the creation of a trouble ticket. In effect, the agent would be the one to interface with the trouble ticket management system 105 to create the trouble ticket, as opposed to the customer. This outcome can undermine the online capability of the trouble ticket management system 105 with respect to how the end users (or customers) themselves can generate the trouble tickets. The objective of the service provider with such capability is to reduce resources and improve customer service; when the customers are deterred from using this capability such objective is gravely undercut. In recognition of this issue, trouble ticket management system 105 provides a capability to obtain feedback from customers on why they are not using the online system. Accordingly, in step 613, trouble ticket management system 105 can obtain feedback information through, in certain embodiments, a graphical user interface (GUI). In one scenario, the customer may not be enrolled or have registered for the online access; such a scenario is plausible, if the customer is an organization and a new administrator for that organization is attempting to submit a trouble ticket request. Nonetheless, the customer may be prompted to create a new online account, as in step 615.

Figure 7:
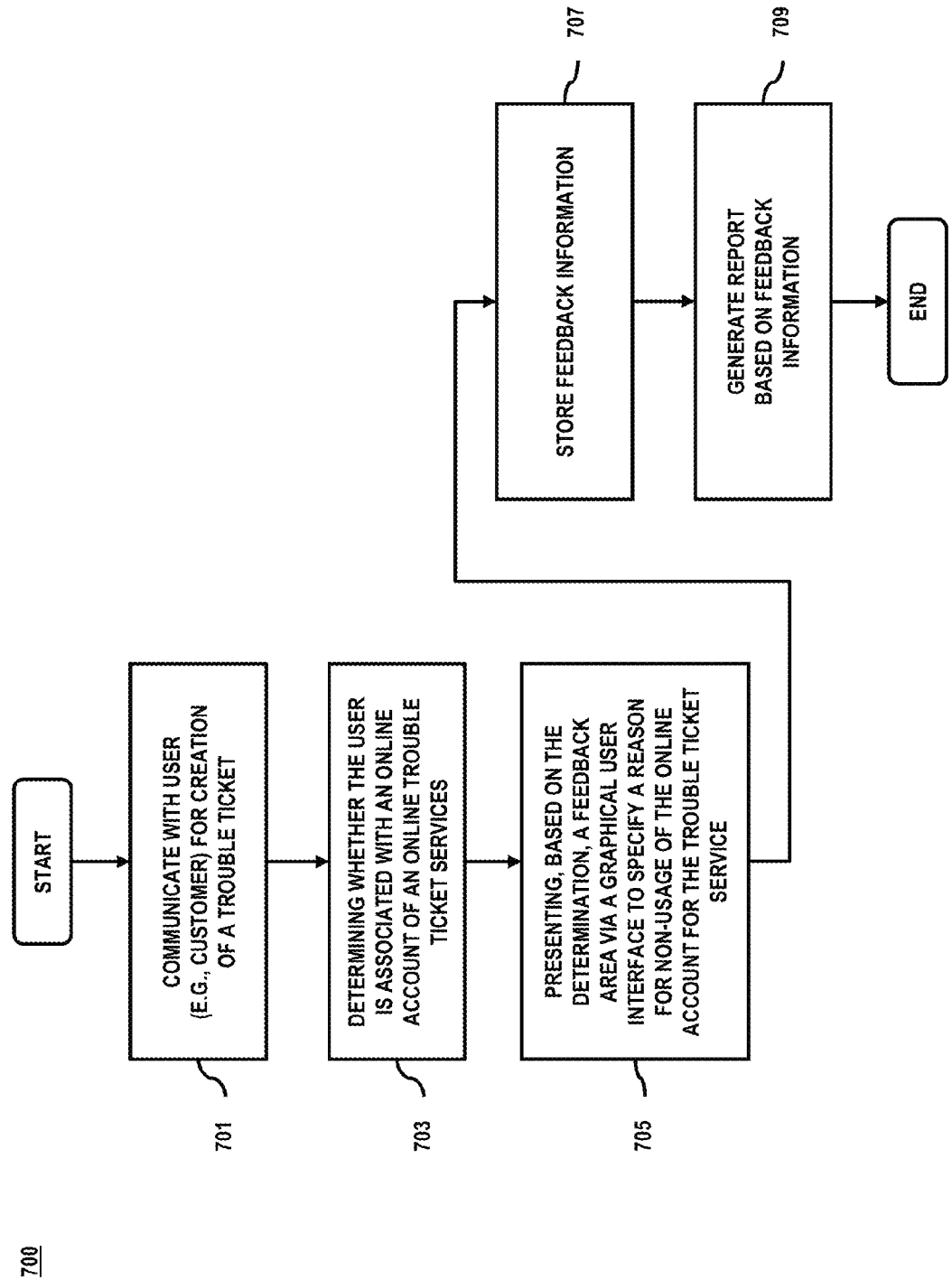
FIG. 7 is a flowchart of a process for obtaining feedback information for encouraging use of an online trouble ticket management system, according to one embodiment.

The process, in some embodiments, for obtaining feedback can proceed in the manner described with respect to FIG. 7.

FIG. 7 is a flowchart of a process for obtaining feedback information for encouraging use of an online trouble ticket management system, according to one embodiment. Process 700 involves, per step 701, communication being initiated with a user for creation of a trouble ticket by an online trouble ticket service. In step 703, a determination is made whether the user is associated with an online account of the trouble ticket service. Based on the determination, a graphical user interface (GUI) is presented and includes a feedback area to specify information indicating a reason for non-usage of the online account for the trouble ticket service (step 705). The feedback information is then stored for later analysis, as in step 707. In step 709, one or more reports can be generated based on the feedback information for analysis. According to certain embodiments, the feedback information obtained from the particular customer can be compiled with feedback data from other customers to assist with the analysis. For example, if the majority of the customers indicate the same reasons for why they are not using the online trouble ticket management system 105 to process a problem, then the service provider can readily determine an appropriate approach to encourage such usage. By way of example, if customers in general convey that the system 105 is complex or slow, then an engineering solution can be developed to reduce the complexity and improve the user-friendlessness of the system as well as enhance the speed of processing. If the majority of the customers reveal that they did not even realize they had user accounts, the service provider can commit more resources to informing these customers, for instance.

Figure 8A:
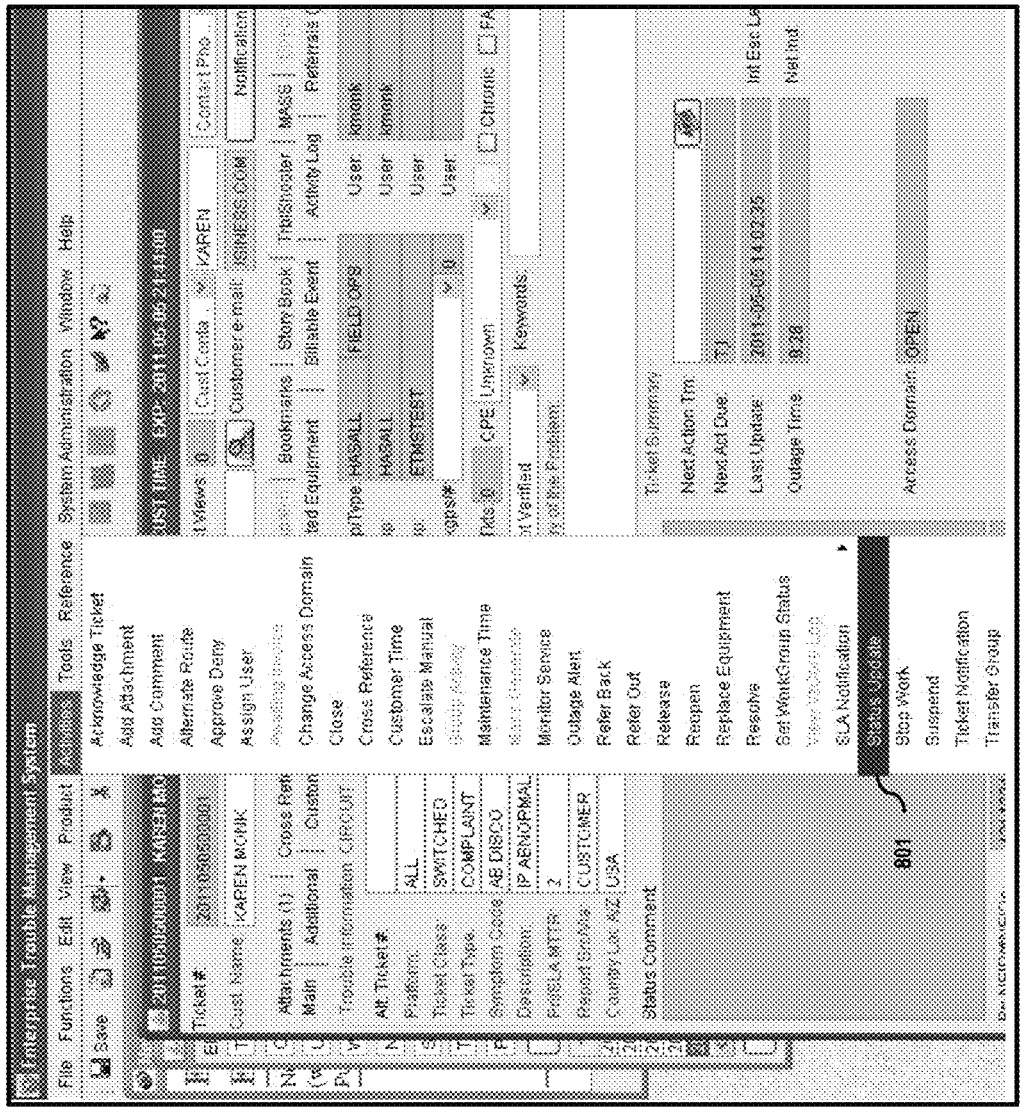
Figure 8B:
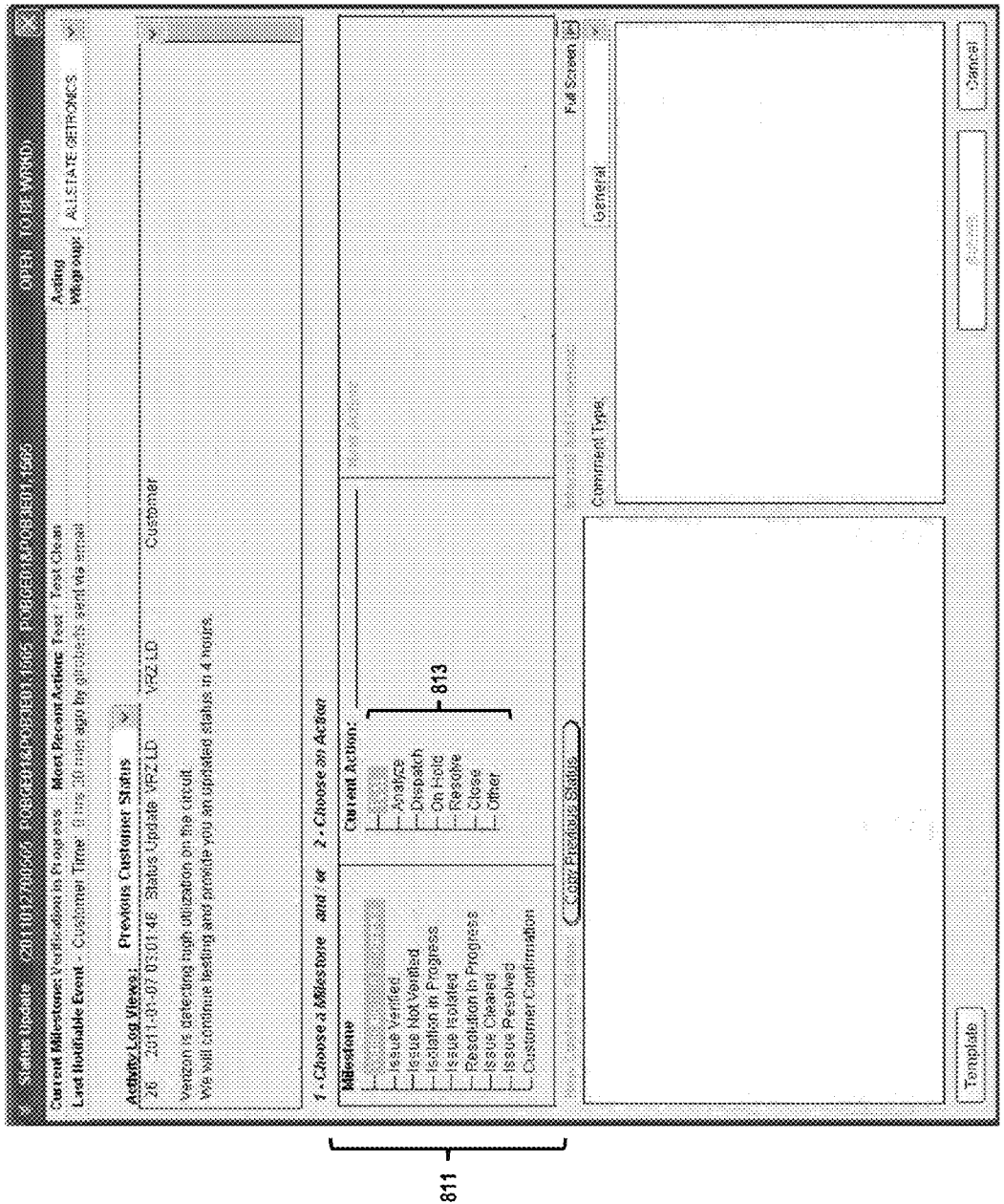
Figure 8C:
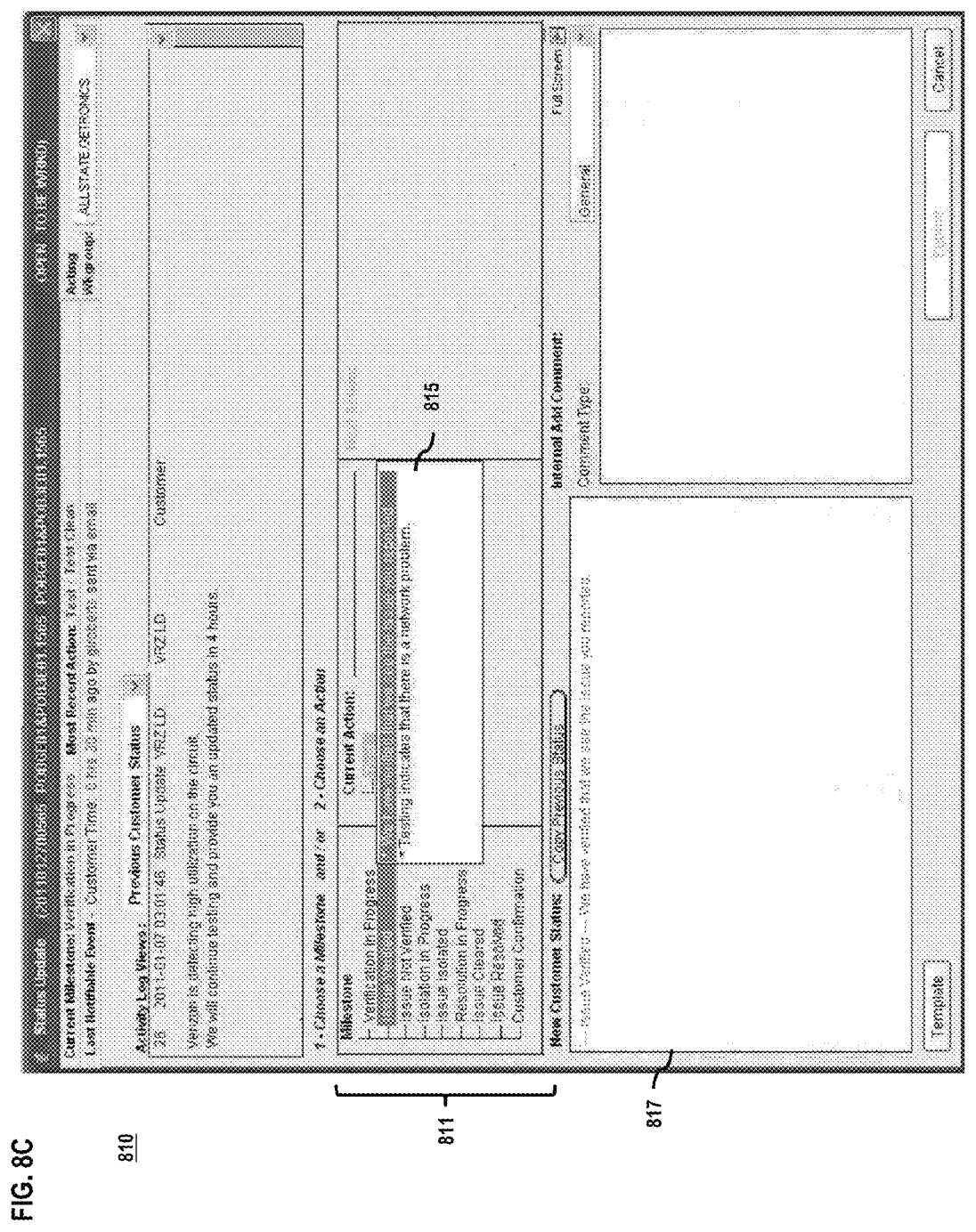

FIGS. 8A-8F are diagrams illustrating exemplary elements of a graphical user interface for selection of status updates, according to various embodiments. In FIG. 8A, GUI 800 shows a list of activities associated with the trouble ticketing service. By way of example, these activities include a status update option 801 that can be invoked to reveal another window 810 shown in FIG. 8B. A milestone section 811 is displayed in which the user can select a desired milestone selection: Verification in Progress, Issue Verified, Issue Not Verified, Isolation in Progress, Issue Isolated, Resolution in Progress, Issue Cleared, Issue Resolved, and Customer Confirmation. Other milestones can be created, depending on the particular service offered by the service provider.

In this example, the user can select a new milestone by clicking on one of the milestones within area 811; at which time, a box 813 with the companion text options can be displayed, and the user clicks on a choice 815 that populates down in the 'New Customer Status' box 817. The user (e.g., agent) may edit information within this box 817; in this manner, specify information that may be of concern to the subscriber can be specified.

Figure 8D:
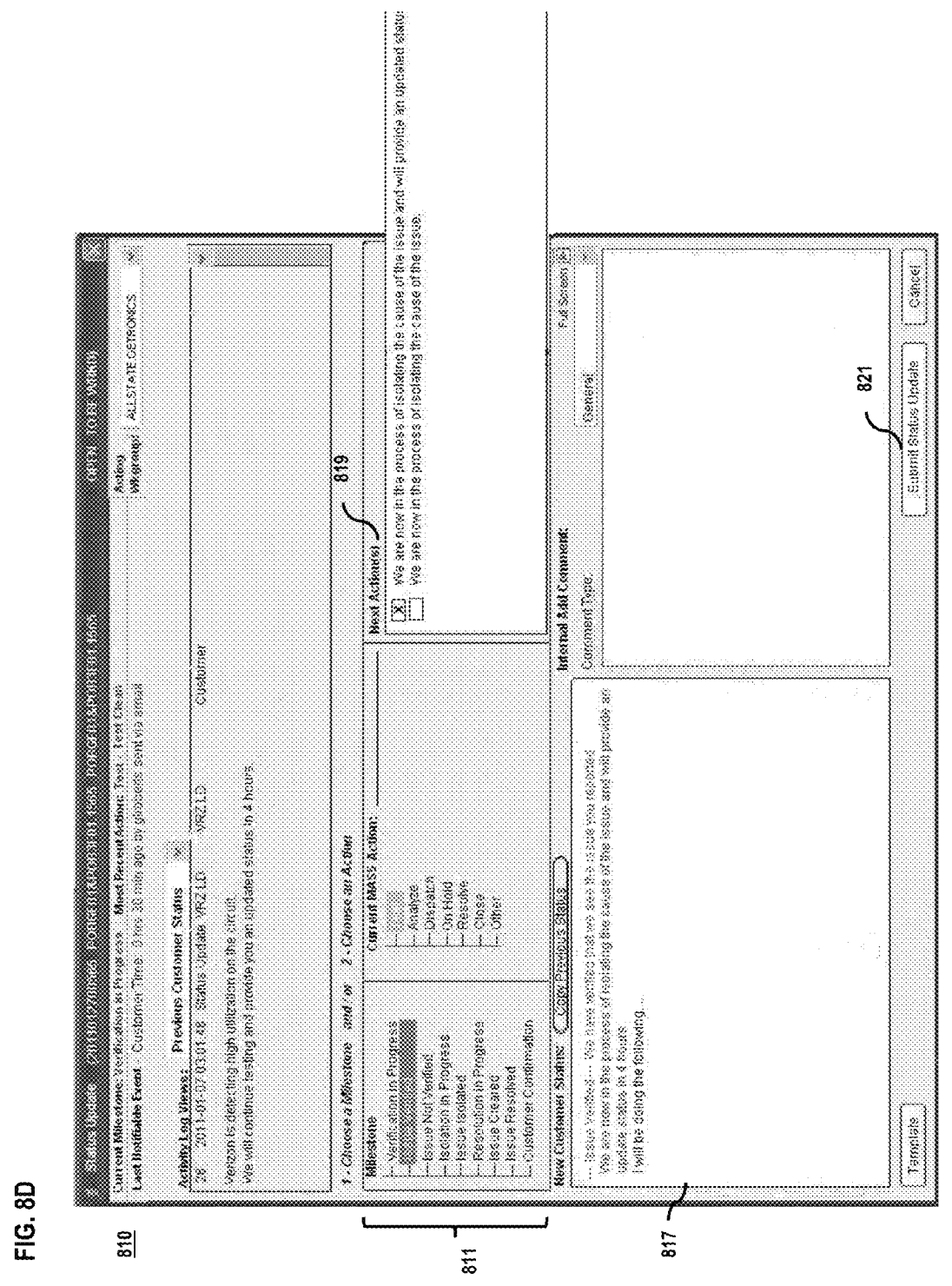

As shown in FIG. 8D, a Next Action area 819 is provided to specify the activity or action that is designed to be performed next in resolution of the trouble ticket. Hence, Next Action area 819 can be populated with the 'Next Action Companion Text' associated with the companion text selection. The user may select one or more 'Next Actions.' As the user selects the information, the text appears in the 'New Customer Status' box 817. If the user "deselects," the text will be removed from the 'New Customer Status' box 817. In one embodiment, once a 'Next Action' has been selected, a 'Submit Status Update' button 821 will be enabled, the designated status update activity is performed.

Figure 8E:
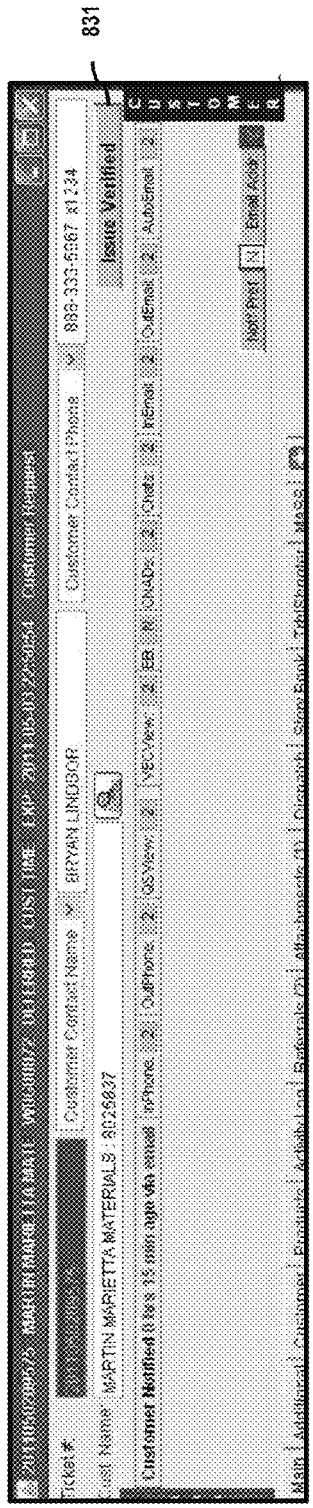
Figure 8F:
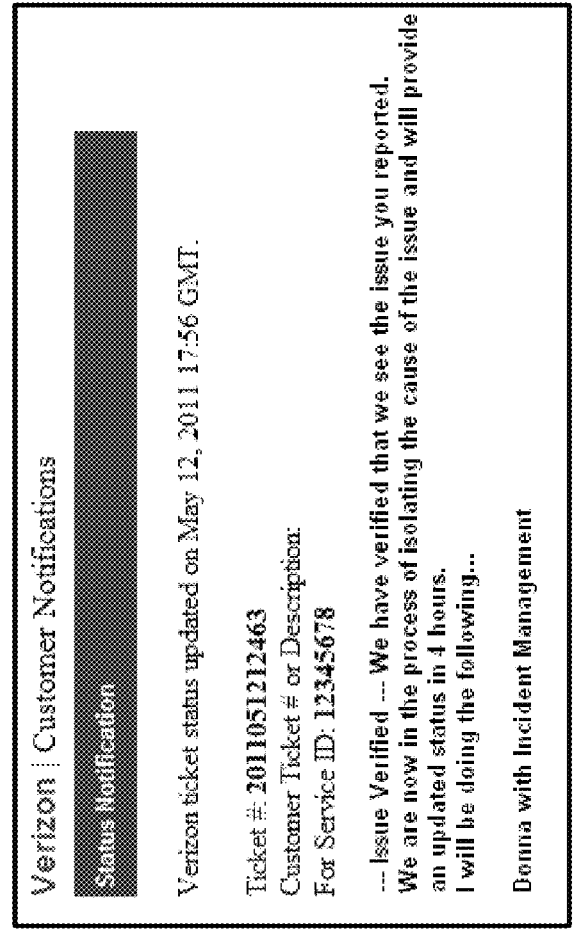

Per FIG. 8E, after the status update is submitted, window 830 is presented, whereby the agent can indicate that the issue (trouble ticket) is verified via button 831. The "ticket" will be updated with the current milestone. This results in the generation of a notification to the customer in form of a notification box 840 of FIG. 8F. In one embodiment, notification box 840 is transmitted to the customer via email. The email notification to the customer can provide the status as captured in the new customer status box along with the closure. Also, this status information (which is included in a notification message) can also be retained in a log file of the trouble ticket management system 105; the log can be maintained in any data repository (e.g., database 505).

Figure 9A:
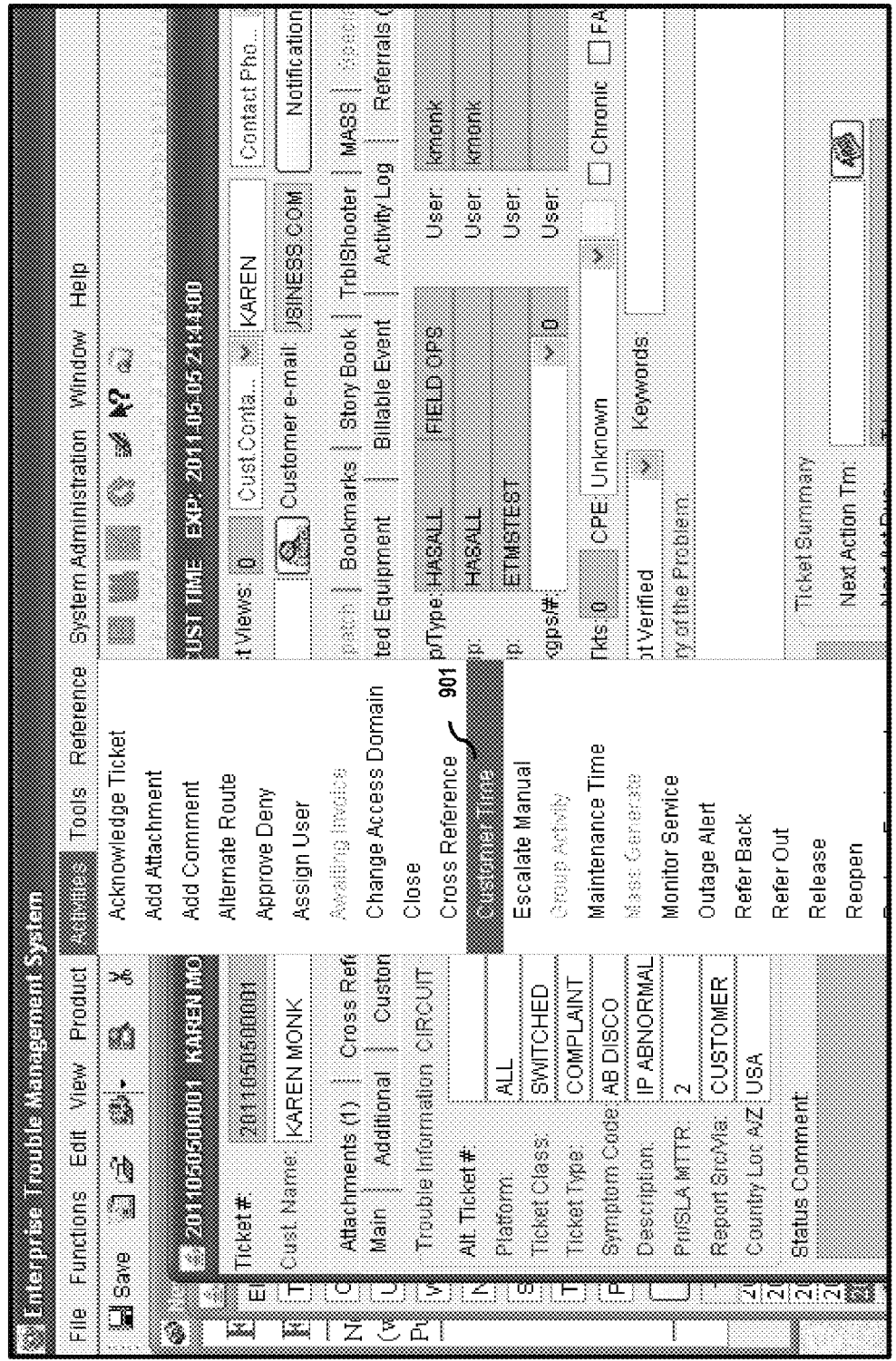
Figure 9B:
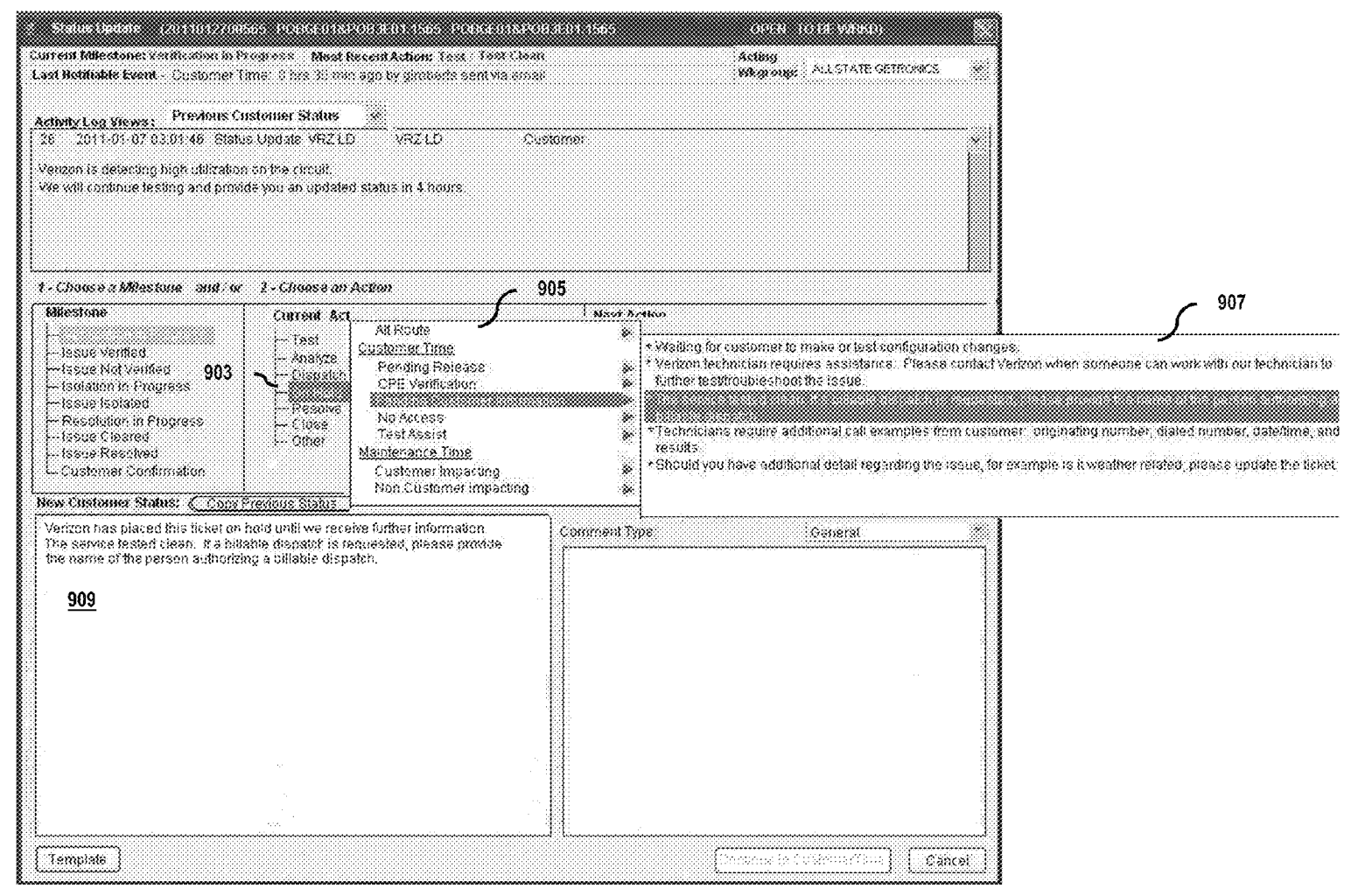

FIGS. 9A-9E are diagrams illustrating exemplary elements of a graphical user interface for selection of status update activity, according to various embodiments. Continuing with the trouble ticket resolution process (as explained in FIGS. 8A-8F), in this scenario, the agent of call center 115. The agent can select the particular status update activity: customer time activity option 901. The agent is presented with the status update activity, denoting that the agent is in the process of performing a customer time activity. As seen in FIG. 9B, the user can select a current action, e.g., On Hold action 903, thereby causing a text box to appear with the Action Detail options 905, which the user can simply "mouse over" to highlight and move the cursor to the right on top of the arrows, triggering the associated companion text box 907 to appear. Once the user activates an entry within text box 907, the companion text also appears in the 'New Customer Status' box 909; and the 'Action Detail' that is selected appears, in this example, to the right of the 'Current Action' title.

Figure 9C:
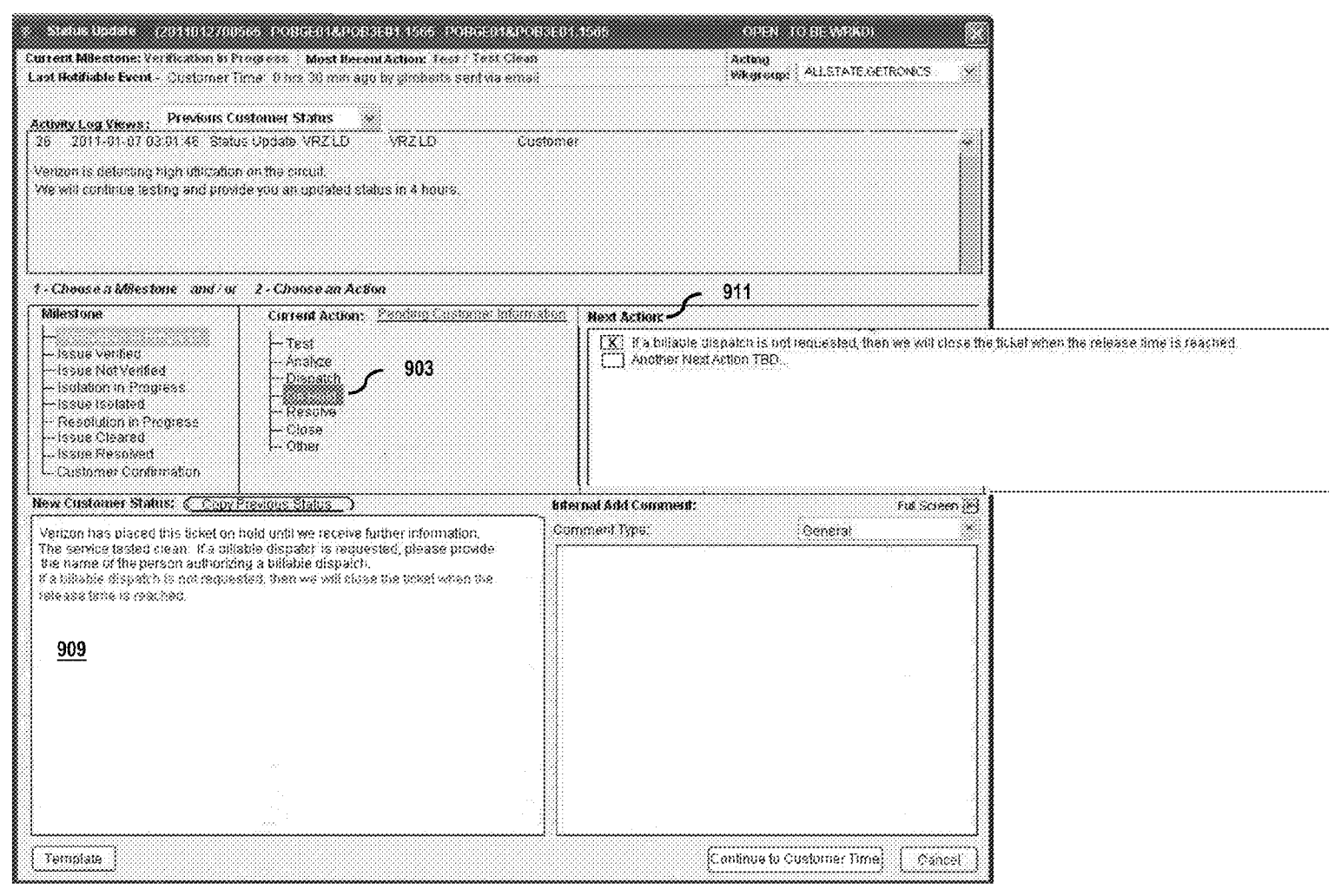
Figure 9D:
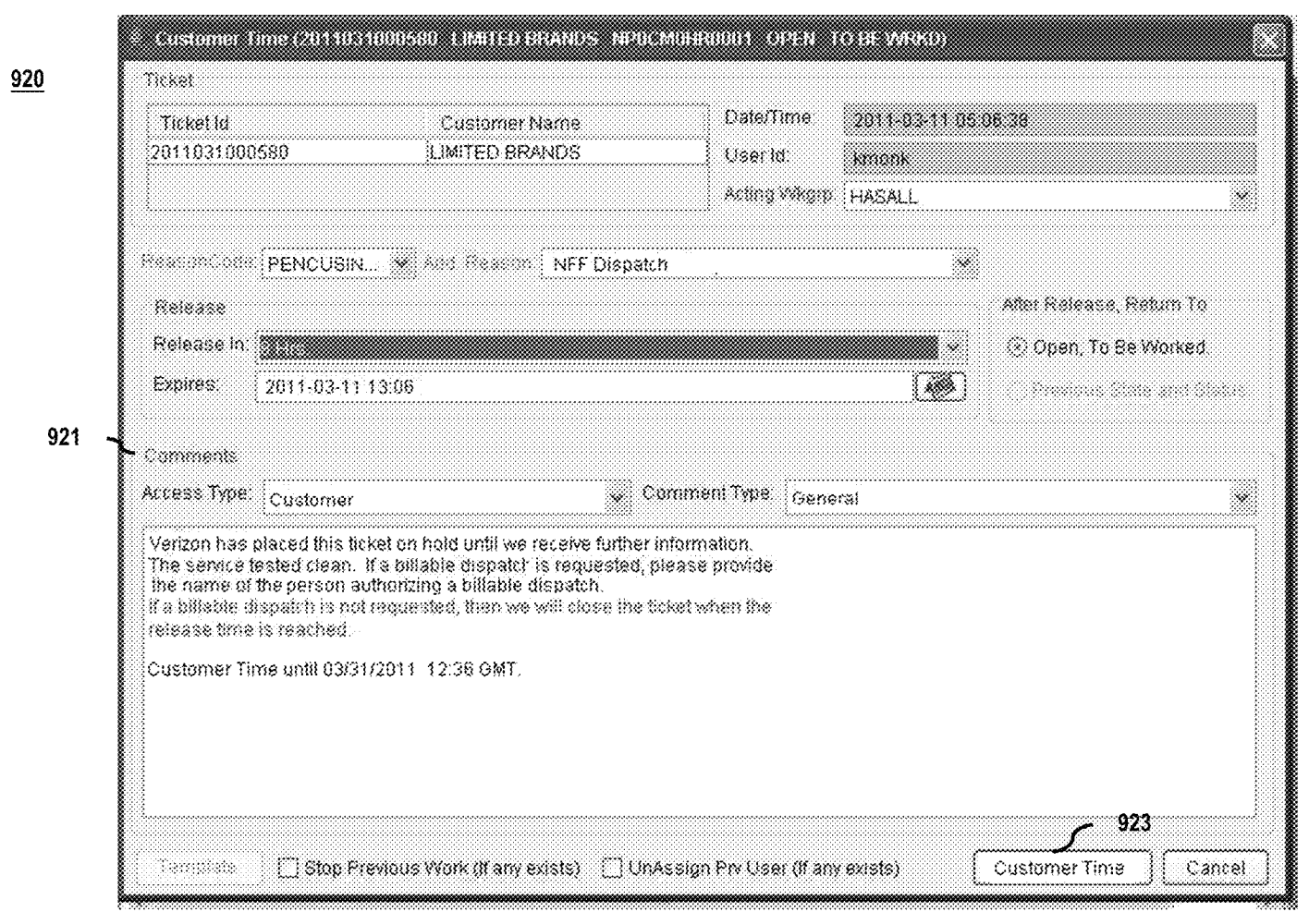

In one embodiment, as shown in FIG. 9C, selection of the On Hold option 903 can also invoke presentation of selectable text options within the Next Action section 911 to augment the information previously displayed in the 'New Customer Status' box 909.

In this example (per FIG. 9D), window 920 corresponds to the Customer Time activity, and can be automatically launched and pre-populated with, for example, a reason code, additional reason. Also, the current 'New Customer Status' can be copied into the 'Comment' box 921. In this situation, the user (e.g., agent in this example) need only enter release time information, but may also edit information in the Comments box 921. In this example, the user initiated the activity from the Status Update Activity, and thus, the user cannot modify the information chosen from that activity—such as, reason and additional reason. Upon completion, the user can simply activate (e.g., by clicking) on the Customer Time button 923 and a customer time activity is submitted.

Figure 9E:
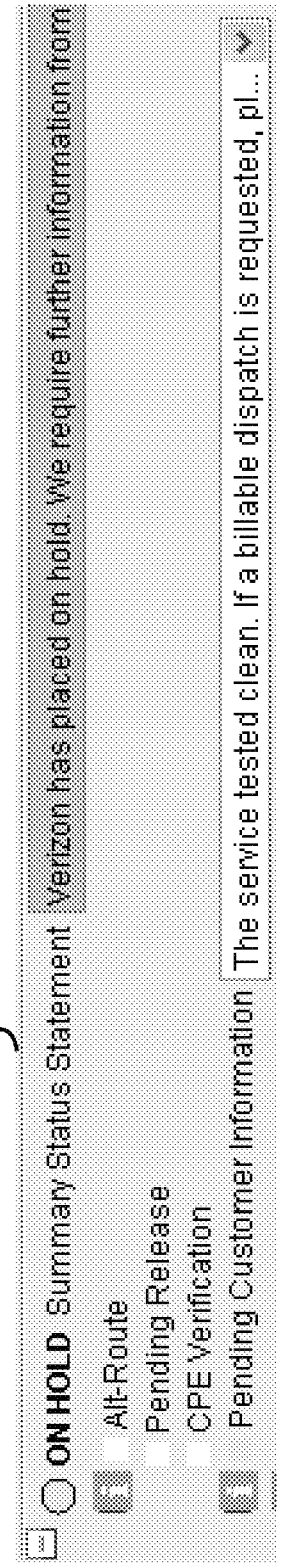

After submission of the customer time activity, the associated milestone of the workflow is updated accordingly (as shown in FIG. 9E) in window 925.

Figure 10:
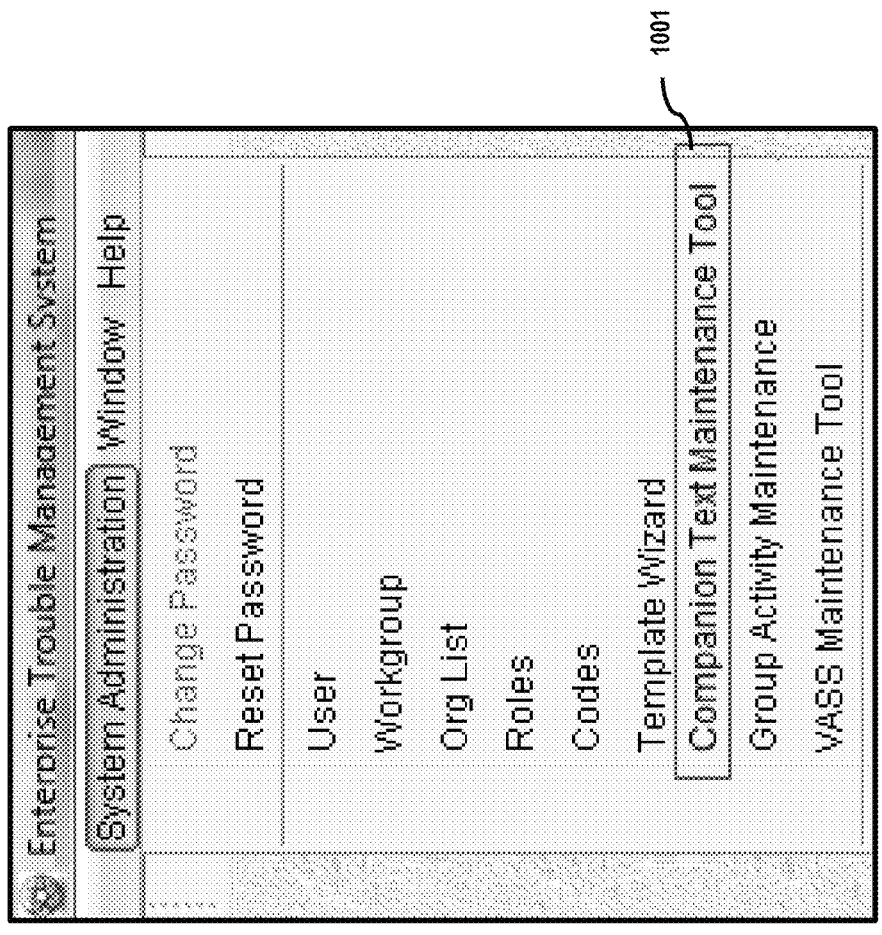
FIGS. 10 and 11 are diagrams of a graphical user interface providing a companion text maintenance capability, according to one embodiment.

FIGS. 10A and 10B are diagrams of a graphical user interface providing a companion text maintenance capability, according to one embodiment. Under this scenario, a window 1000 supports a companion text maintenance tool option 1001, which provides "statusing" (i.e., obtaining status information) a ticket as part of a natural workflow. In certain embodiments, the companion text function is workgroup configurable—like a template. As shown, window 1000 can be provided with this companion text maintenance tool can be under a System Administration Panel. In this example, the agent can be part of an acting workgroup, and can be provided with the following functions with respect to the companion text: Create, Update, Delete, Search, Copy Rules, and Preview.

Figure 11:
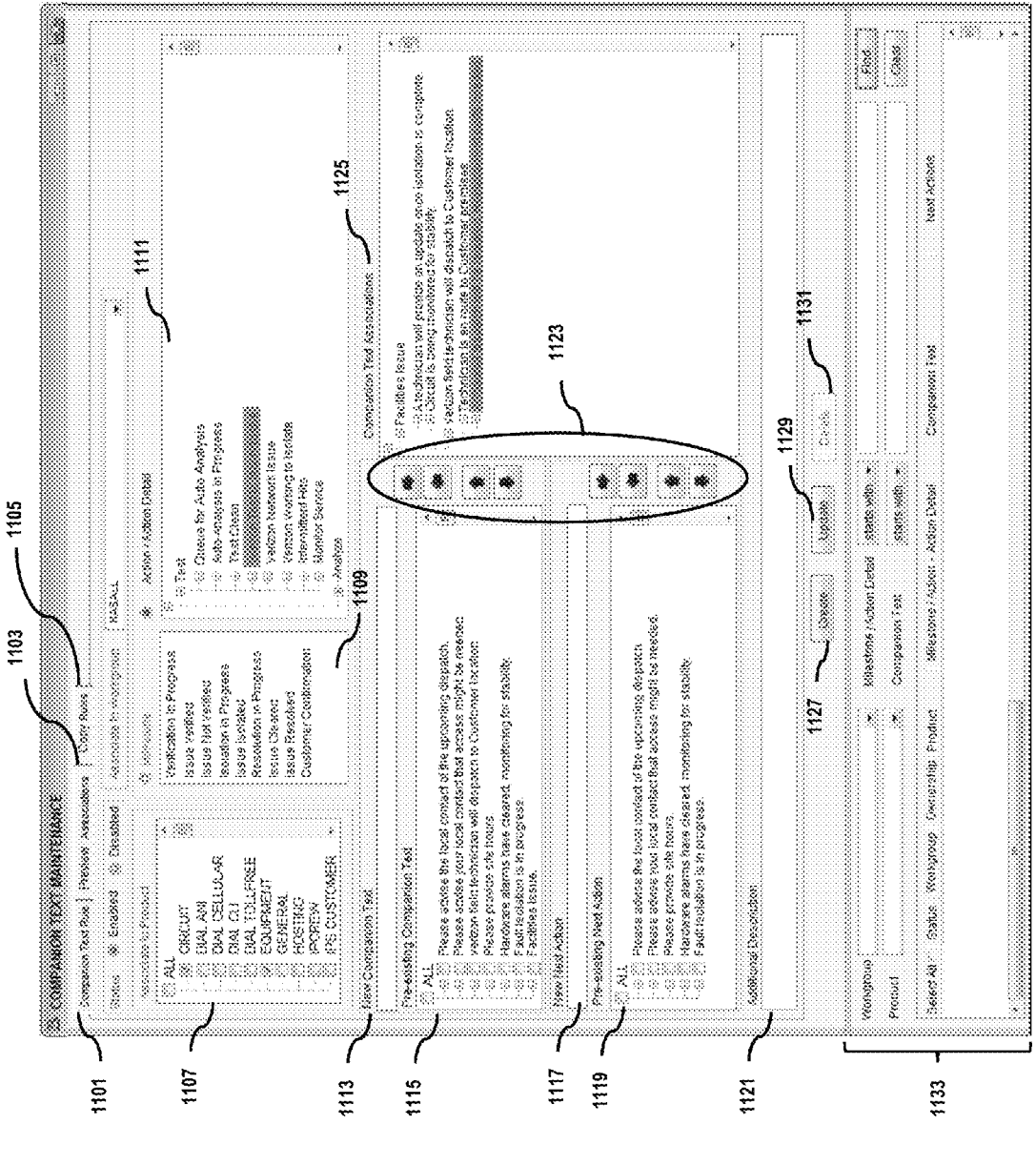

As illustrated in FIG. 11, the Companion Text Maintenance window (or pane) 1100 includes the following tabs: Companion Text Rules tab 1101, Preview Associations tab 1103, and a Copy Rules tab 1105. By way of example, the Companion Text Rules tab 1103 provides the following areas: Companion Text Rule Definition and Search Capability. The Companion Text Rule Definition area can utilize a Status (radio button) with the following values: "Enabled" or "Disabled." Additionally, the Companion Text Rule Definition area can provide an Associate to Workgroup area 1107 (e.g., dropdown menu) to specify the acting workgroup list, a Milestone area 1109 (e.g., box). In this example, the Associate to Workgroup area 1107 contains a tree structure with values of the available products associated with the service of the service provider.

The Milestone box 1109, for instance, lists the following exemplary milestones: Verification in Progress, Issue Verified, Issue Not Verified, Isolation in Progress, Issue Isolated, Resolution in Progress, Issue Cleared, Issue Resolved, and Customer Confirmation. As previously noted, the milestones can be defined by the user and depends on the particular service offered by the service provider.

Further, an Action/Detail area 1111 is presented within window 1100 as a tree structure, in which the main level includes the following functions: Test, Analyze, Dispatch, On-Hold, Resolve, Close, and Other. With respect to the Test function, this can be further defined as follows: Queue for Auto-Analysis, Auto-Analysis in Progress, Test Clean, Test is Inconclusive, Network Issue, Working to Isolate, Intermittent Hits, and Monitor Service. For the Analyze function, the second level functions may include: External Referral, Queued for Technician, Assigned to a Technician, Technician Working Issue, and Correlate Outage. For the Dispatch function, the second level functions may include: Pending Dispatch, Technician En Route, Technician En Route to Site, Technician On-Site, Technician Dispatched Outside of a Local Facility, Complete Dispatch, Multiple Dispatches, Pending Third Party Dispatch, Third Party Technician En-Route to Local Provider Site, Third Party Technician dispatched Outside Their Facility, Third Party On-Site, Complete Third Party Dispatch, Ticket Referred Out To Multiple Third Parties, Ticket Referred Out to Third Party and Service Provider Dispatch.

Regarding the On-hold function, the second-level functions may be defined as follows: Alt-Route, Pending Release, CPE Verification, Pending Customer Information, No Access, Test Assist, and Maintenance Window.

Window 1100 can also provide a New Companion Text area 1113 (e.g., free text field), wherein the user can input new companion text. In addition, a Pre-existing Companion Text area 1115 can be presented, and populated with a list of suggestions of Companion Text values (stored for the Milestone or Action/Action Detail selected). A New Next Action area 1115 (e.g., free text field) permits the user to specify a new next action. Additionally, a Pre-existing Next Actions area 1119 is utilized to specify a full Companion Text list.

Moreover, companion text maintenance window 1100 can provide an Additional Description area 1121 (e.g., free text field), whereby the user can input any type of additional information associated to the rule.

A Companion Text Associations area 1125 displays the relationship of the companion text values. Control buttons 1123, in form of arrows (upper set), permit the user to manipulate elements from the Companion Text Associations box 1125, while the lower set of arrows pertain to the Next Action elements. For example, the up arrow can move the element up in its level, and the down arrow causes the element to move down its level. The left arrow and right arrow can perform the association, whereby the right arrow causes an association, while the left arrow results in a disassociation.

A create button 1127 creates the Companion Text rule. An update button 1129 triggers updating of the Companion Text rule. Also, when activated, a delete button 1131 will cause deletion of the Companion Text rule.

A Search Capability area 1133 enables the user to locate a particular companion text using various filter parameters. For example, a Workgroup area (e.g., dropdown menu) can specify the workgroup list. Also, a Product area is provided in form of, e.g., a dropdown menu to indicate the dropdown values of the services and products. In addition, a Milestone/Action Detail area can be a freeform text field that searches according to a Milestone or Action Detail value depending on one or more selected criteria; this search can be made more efficient with a "Starts With" dropdown. Further a Companion Text field within area 1133 can be a text field (e.g., limited to 150 chars) that searches in Companion Text Name depending on a selected criteria (starts with, is, contains). A Find button launches the search based on specified criteria, while a Clear button removes all the values within search fields.

Figure 12:
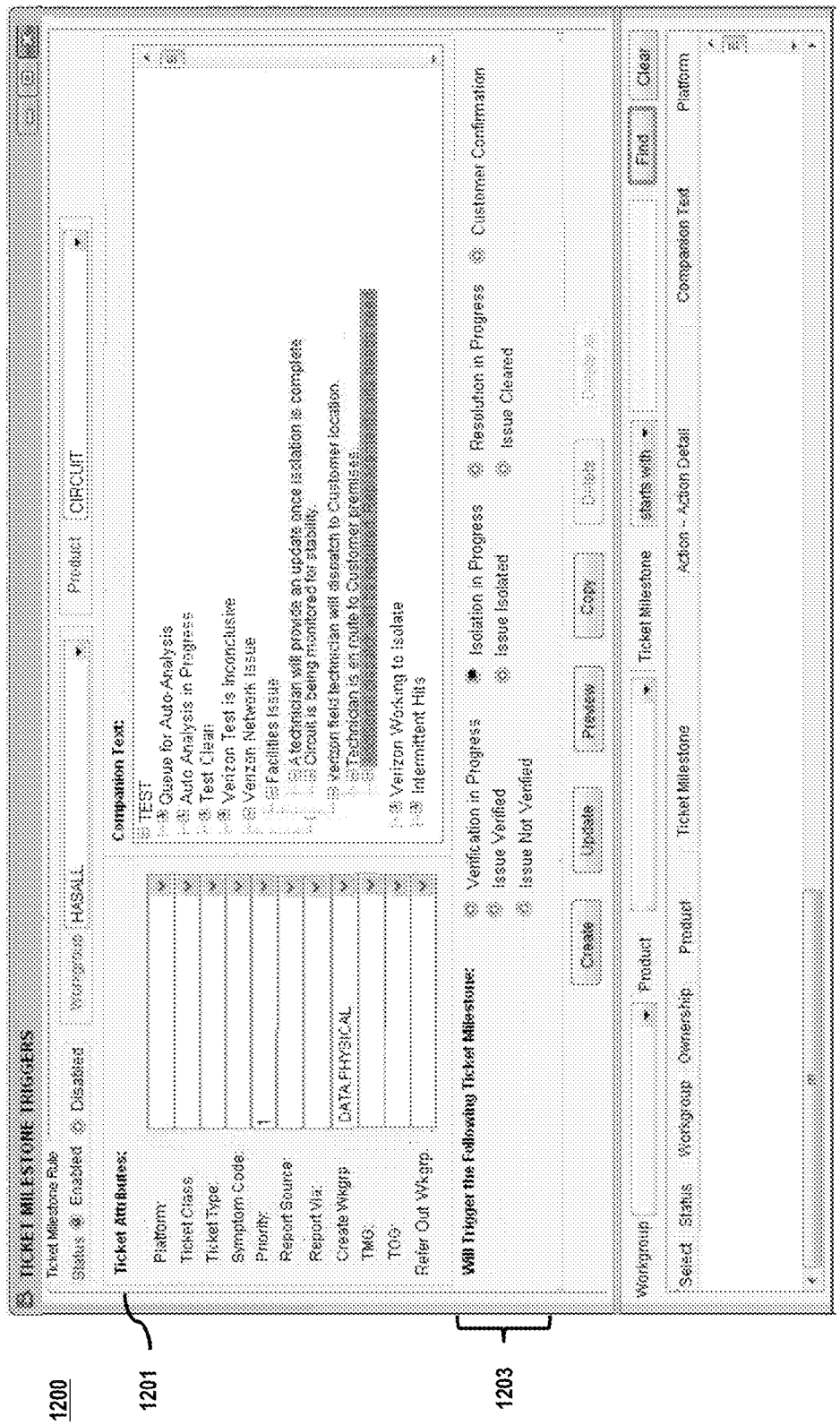
FIG. 12 is a diagram of a graphical user interface relating to triggers for ticket milestones, according to one embodiment.

FIG. 12 is a diagram of a graphical user interface relating to triggers for ticket milestones, according to one embodiment.

Window 1200 provides the user with the capability to set what scenarios will automate the movement of ticket milestones within a workgroup. As seen, a Ticket Attributes area 1201 can allow the user to specify various attributes of the ticket to be trigger a ticket milestone. In certain embodiments, the ticket milestone is automatically invoked based on the specified attributes. Additionally, a milestone trigger area 1203 enumerates the relevant milestones, whereby the user can select a particular one or more milestones.

The processes described herein for providing enhanced trouble ticket status content may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 13:
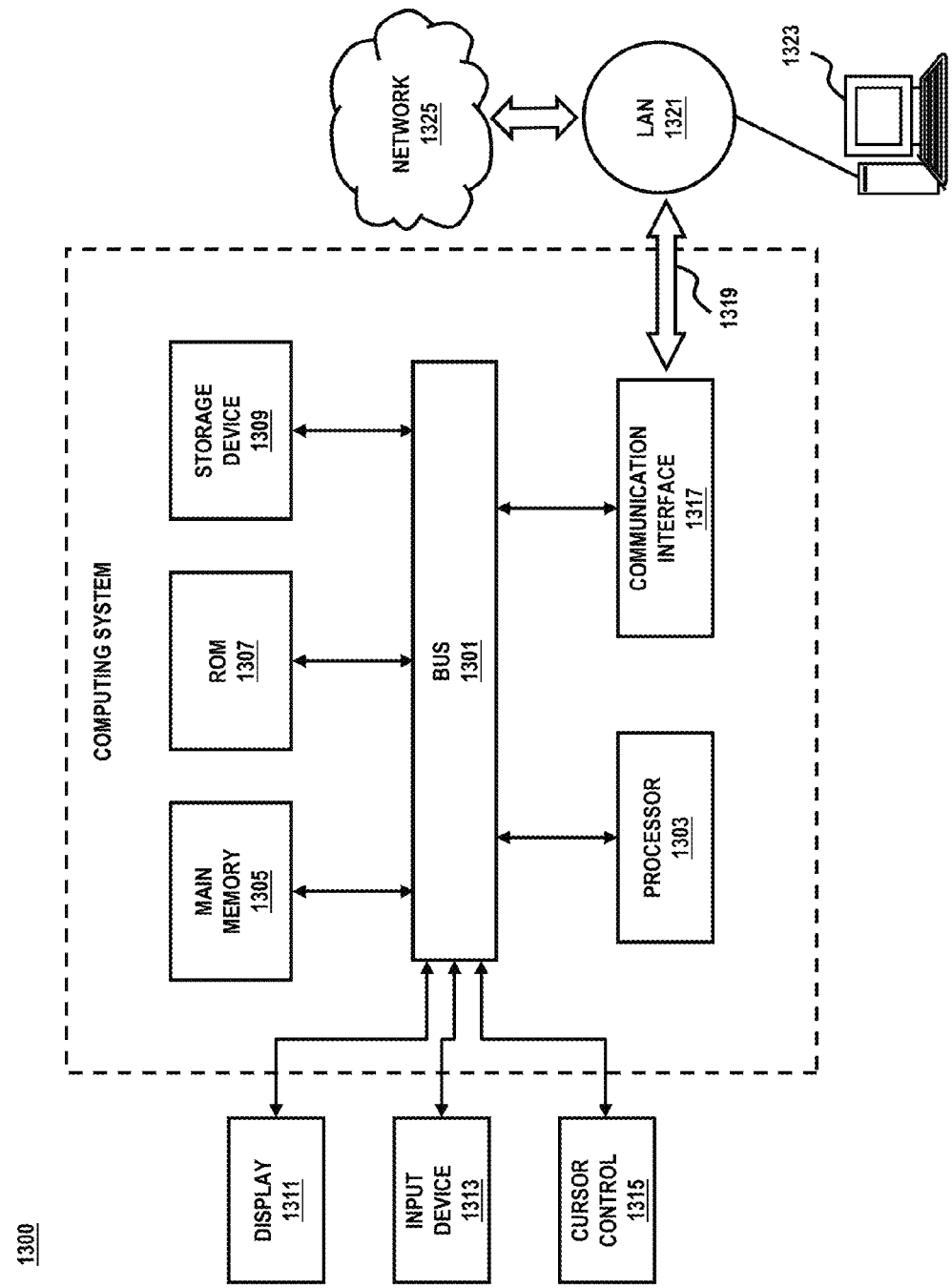
FIG. 13 is a diagram of a computer system that can be used to implement various exemplary embodiments.

FIG. 13 illustrates computing hardware (e.g., computer system) 1300 upon which exemplary embodiments can be implemented. The computer system 1300 includes a bus 1301 or other communication mechanism for communicating information and a processor 1303 coupled to the bus 1301 for processing information. The computer system 1300 also includes main memory 1305, such as a random access memory (RAM) or other dynamic storage device, coupled to the bus 1301 for storing information and instructions to be executed by the processor 1303. Main memory 1305 can also be used for storing temporary variables or other intermediate information during execution of instructions by the processor 1303. The computer system 1300 may further include a read only memory (ROM) 1307 or other static storage device coupled to the bus 1301 for storing static information and instructions for the processor 1303. A storage device 1309, such as a magnetic disk or optical disk, is coupled to the bus 1301 for persistently storing information and instructions.

The computer system 1300 may be coupled via the bus 1301 to a display 1311, such as a cathode ray tube (CRT), liquid crystal display, active matrix display, or plasma display, for displaying information to a computer user. An input device 1313, such as a keyboard including alphanumeric and other keys, is coupled to the bus 1301 for communicating information and command selections to the processor 1303. Another type of user input device is a cursor control 1315, such as a mouse, a trackball, or cursor direction keys, for communicating direction information and command selections to the processor 1303 and for controlling cursor movement on the display 1311.

According to an exemplary embodiment, the processes described herein are performed by the computer system 1300, in response to the processor 1303 executing an arrangement of instructions contained in main memory 1305. Such instructions can be read into main memory 1305 from another computer-readable medium, such as the storage device 1309. Execution of the arrangement of instructions contained in main memory 1305 causes the processor 1303 to perform the process steps described herein. One or more processors in a multi-processing arrangement may also be employed to execute the instructions contained in main memory 1305. In alternative embodiments, hard-wired circuitry may be used in place of or in combination with software instructions to implement exemplary embodiments. Thus, exemplary embodiments are not limited to any specific combination of hardware circuitry and software.

The computer system 1300 also includes a communication interface 1317 coupled to bus 1301. The communication interface 1317 provides a two-way data communication coupling to a network link 1319 connected to a local network 1321. For example, the communication interface 1317 may be a digital subscriber line (DSL) card or modem, an integrated services digital network (ISDN) card, a cable modem, a telephone modem, or any other communication interface to provide a data communication connection to a corresponding type of communication line. As another example, communication interface 1317 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1317 sends and receives electrical, electromagnetic, or optical signals that carry digital data streams representing various types of information. Further, the communication interface 1317 can include peripheral interface devices, such as a Universal Serial Bus (USB) interface, a PCMCIA (Personal Computer Memory Card International Association) interface, etc. Although a single communication interface 1317 is depicted in FIG. 13, multiple communication interfaces can also be employed.

The network link 1319 typically provides data communication through one or more networks to other data devices. For example, the network link 1319 may provide a connection through local network 1321 to a host computer 1323, which has connectivity to a network 1325 (e.g. a wide area network (WAN) or the global packet data communication network now commonly referred to as the "Internet") or to data equipment operated by a service provider. The local network 1321 and the network 1325 both use electrical, electromagnetic, or optical signals to convey information and instructions. The signals through the various networks and the signals on the network link 1319 and through the communication interface 1317, which communicate digital data with the computer system 1300, are exemplary forms of carrier waves bearing the information and instructions.

The computer system 1300 can send messages and receive data, including program code, through the network(s), the network link 1319, and the communication interface 1317. In the Internet example, a server (not shown) might transmit requested code belonging to an application program for implementing an exemplary embodiment through the network 1325, the local network 1321 and the communication interface 1317. The processor 1303 may execute the transmitted code while being received and/or store the code in the storage device 1309, or other non-volatile storage for later execution. In this manner, the computer system 1300 may obtain application code in the form of a carrier wave.

The term "computer-readable medium" as used herein refers to any medium that participates in providing instructions to the processor 1303 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 1309. Volatile media include dynamic memory, such as main memory 1305. Transmission media include coaxial cables, copper wire and fiber optics, including the wires that comprise the bus 1301. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 14 illustrates a chip set 1400 upon which an embodiment of the invention may be implemented. Chip set 1400 is programmed to present a slideshow as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1400, or a portion thereof, constitutes a means for performing one or more steps of FIGS. 2-4, 6, and 7, as well as a means for presenting the graphical user interface of FIGS. 8-12.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to providing notification of a change in path condition. The memory 1405 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    monitoring, via a processor and as part of a workflow, one or more activities associated with a trouble ticket corresponding to a service of a service provider, wherein the one or more activities are tracked by a workflow engine;
    repeatedly acquiring status information for the one or more activities via the processor until a predetermined milestone is reached according to the workflow;
    storing the status information in a memory device for presentation to a subscriber of the service;
    presenting a prompt, via a graphical user interface, to a user designated to execute the one or more activities,
    wherein the user is an agent of the service provider, and the prompt is presented to acquire the status information;
    presenting the status information to the subscriber;
    presenting the status information to the user designated to execute the one or more activities to notify the user of what status information is provided to the subscriber; and
    invoking an instant communication session with one or more members of a workgroup designated to resolve the trouble ticket.

2. A method according to claim 1, further comprising:
    determining whether the status information to be presented to the subscriber is different from a previously presented status information; and
    presenting the status information to the subscriber if the status information is determined to be different.

3. A method according to claim 1, wherein the status information is presented to the subscriber as part of the workflow prior to a request by subscriber for the status information.

4. A method according to claim 1, further comprising:
    receiving input from the agent to specify milestone information for the workflow.

5. An apparatus comprising:
    at least one processor; and
    at least one memory including computer program code for one or more programs,
    the at least one memory and the computer program code configured to, with the at least one processor, cause the apparatus to perform at least the following,
        monitor, as part of a workflow, one or more activities associated with a trouble ticket corresponding to a service of a service provider, wherein the one or more activities are tracked by a workflow engine,
        repeatedly acquire status information for the one or more activities until a predetermined milestone is reached according to the workflow,
        store the status information for presentation to a subscriber of the service,
        present a prompt, via a graphical user interface, to a user designated to execute the one or more activities, wherein the user is an agent of the service provider, and the prompt is presented to acquire the status information, present the status information to the subscriber;

present the status information to a user designated to execute the one or more activities to notify the user of what status information is provided to the subscriber; and invoke an instant communication session with one or more members of a workgroup designated to resolve the trouble ticket.

6. An apparatus according to claim 5, wherein the apparatus is further caused to:

determine whether the status information to be presented to the subscriber is different from a previously presented status information; and present the status information to the subscriber if the status information is determined to be different.

7. An apparatus according to claim 5, wherein the status information is presented to the subscriber as part of the workflow prior to a request by subscriber for the status information.

8. An apparatus according to claim 5, wherein the apparatus is further caused to:

receive input from the agent to specify milestone information for the workflow.

9. A system comprising:

a communication platform including a web access portal and a delivery access portal;

an online trouble ticket system in communication with the communication platform, the online trouble ticket system including a workflow and rules memory database storing a workflow corresponding to problems associated with a service, the online trouble ticket system being configured to monitor, as part of the workflow, one or more activities associated with a trouble ticket corresponding to a service of a service provider, wherein the one or more activities are tracked by a workflow engine of the trouble ticket system, the trouble ticket system being further configured to repeatedly acquire status information for the one or more activities until a predetermined milestone is reached according to the workflow; and a memory coupled to the trouble ticket system and configured to store the status information for presentation to a subscriber of the service, the trouble ticket system being further configured to repeatedly acquire status information for the one or more activities until a predetermined milestone is reached according to the workflow; and a memory coupled to the trouble ticket system and configured to store the status information for presentation to a subscriber of the service, the trouble ticket system is further configured:

to present a prompt, via a graphical user interface, to a user designated to execute the one or more activities, wherein the user is an agent of the service provider, and the prompt is presented to acquire the status information;

to present the status information to the subscriber;

to present the status information to the user designated to execute the one or more activities to notify the user of what status information is provided to the subscriber; and to invoke an instant communication session with one or more members of a workgroup designated to resolve the trouble ticket.

10. A system according to claim 9, wherein the trouble ticket system is further configured to determine whether the status information to be presented to the subscriber is different from a previously presented status information, and to present the status information to the subscriber if the status information is determined to be different.

11. A system according to claim 9, wherein the status information is presented to the subscriber as part of the workflow prior to a request by subscriber for the status information.

12. A system according to claim 9, wherein the trouble ticket system is further configured to receive input from the agent to specify milestone information for the workflow.

* * * * *